US011808578B2

(12) United States Patent
Wissler et al.

(10) Patent No.: US 11,808,578 B2
(45) Date of Patent: Nov. 7, 2023

(54) GLOBAL POSITIONING DENIED NAVIGATION

(71) Applicant: Aurora Flight Sciences Corporation, Manassas, VA (US)

(72) Inventors: John B. Wissler, Waltham, MA (US); Jeffery Saunders, Quincy, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 569 days.

(21) Appl. No.: 16/888,237

(22) Filed: May 29, 2020

(65) Prior Publication Data

US 2021/0375145 A1   Dec. 2, 2021

(51) Int. Cl.
*G01C 21/20* (2006.01)
*G06N 3/08* (2023.01)
(Continued)

(52) U.S. Cl.
CPC ............... *G01C 21/20* (2013.01); *G06N 3/08* (2013.01); *G06N 7/01* (2023.01); *G06V 10/48* (2022.01);
(Continued)

(58) Field of Classification Search
CPC .. G08G 5/0086; G08G 5/0021; G08G 5/0039; G08G 5/0047; G06N 3/08; G06N 7/005; G06N 7/01; G06V 20/13; G06V 10/48; G01C 11/04; G01C 21/20; G01C 21/24; G01S 5/16; G01S 19/15; G01S 19/485
See application file for complete search history.

(56) References Cited

U.S. PATENT DOCUMENTS 3,786,505 A * 1/1974 Rennie ................... G01C 23/00
701/496
4,847,769 A * 7/1989 Reeve ..................... G01C 21/12
701/466
(Continued)

FOREIGN PATENT DOCUMENTS

EP    2662664 A2 * 11/2013 ............. G01C 17/38
GB    2568286 A  *  5/2019 ........... G01C 21/005
(Continued)

OTHER PUBLICATIONS

Allotta, B., Costanzi, R., Fanelli, F., Monni, N., & Ridolfi, A. (2015). Single axis FOG aided attitude estimation algorithm for mobile robots. Mechatronics, 30, 158-173. (Year: 2015).*
(Continued)

*Primary Examiner* — Angelina Shudy
(74) *Attorney, Agent, or Firm* — Yee & Associates, P.C.

(57) ABSTRACT

A method, an apparatus, system, and computer program product for navigating an aircraft. Information indicative of a result of a scan of an environment around the aircraft is received by a computer system for landmarks. Bearings of the landmarks and locations of the landmarks are determined by the computer system. A current position of the aircraft is estimated by the computer system using the bearings of the landmarks and the locations of the landmarks. A set of actions to be performed is determined to guide the aircraft based on the current position of the aircraft is performed by the computer system.

28 Claims, 10 Drawing Sheets

(51) Int. Cl.
  *G08G 5/00* (2006.01)
  *G06V 20/13* (2022.01)
  *G06N 7/01* (2023.01)
  *G06V 10/48* (2022.01)

(52) U.S. Cl.
  CPC ........... *G06V 20/13* (2022.01); *G08G 5/0021* (2013.01); *G08G 5/0039* (2013.01); *G08G 5/0047* (2013.01); *G08G 5/0086* (2013.01)

(56) References Cited

U.S. PATENT DOCUMENTS

| | | | | |
|---|---|---|---|---|
| 6,597,818 | B2* | 7/2003 | Kumar | G06T 7/35 |
| | | | | 707/999.102 |
| 7,191,056 | B2 | 3/2007 | Costello et al. | |
| 8,306,273 | B1* | 11/2012 | Gravseth | G01S 17/06 |
| | | | | 382/106 |
| 9,037,411 | B2* | 5/2015 | Bageshwar | G01C 17/38 |
| | | | | 701/538 |
| 10,065,312 | B1 | 9/2018 | Ross | B25J 9/1628 |
| 10,247,556 | B2* | 4/2019 | Mourikis | G01S 19/13 |
| 10,295,365 | B2* | 5/2019 | Scherer | G01S 19/48 |
| 10,515,458 | B1* | 12/2019 | Yakimenko | G06T 7/74 |
| 11,036,240 | B1* | 6/2021 | Irschara | G01S 19/24 |
| 11,399,531 | B1* | 8/2022 | Sibley | A01C 21/007 |
| 11,530,919 | B1* | 12/2022 | Myers | G06V 10/74 |
| 2006/0149458 | A1* | 7/2006 | Costello | G06T 7/73 |
| | | | | 701/438 |
| 2008/0144925 | A1* | 6/2008 | Zhu | G06V 10/24 |
| | | | | 382/154 |
| 2008/0167814 | A1* | 7/2008 | Samarasekera | G06T 7/74 |
| | | | | 701/469 |
| 2008/0238770 | A1* | 10/2008 | Rofougaran | G01C 21/20 |
| | | | | 342/357.32 |
| 2010/0256907 | A1* | 10/2010 | Bye | G01C 21/185 |
| | | | | 73/178 R |
| 2011/0150286 | A1* | 6/2011 | Ishigami | G06T 7/77 |
| | | | | 382/106 |
| 2011/0282580 | A1* | 11/2011 | Mohan | G01S 19/485 |
| | | | | 701/472 |
| 2011/0282622 | A1* | 11/2011 | Canter | G06T 19/20 |
| | | | | 702/150 |
| 2012/0076409 | A1* | 3/2012 | Guo | G06V 10/752 |
| | | | | 382/173 |
| 2012/0106800 | A1* | 5/2012 | Khan | G06T 7/20 |
| | | | | 382/104 |
| 2012/0197519 | A1* | 8/2012 | Richardson | G01C 21/3647 |
| | | | | 701/508 |
| 2012/0206596 | A1* | 8/2012 | Samarasekera | H04N 13/239 |
| | | | | 348/135 |
| 2013/0304383 | A1 | 11/2013 | Bageshwar et al. | |
| 2014/0210663 | A1 | 7/2014 | Metzler | |
| 2015/0304634 | A1* | 10/2015 | Karvounis | G06F 18/21355 |
| | | | | 348/46 |
| 2016/0078303 | A1* | 3/2016 | Samarasekera | G06F 18/22 |
| | | | | 348/47 |
| 2016/0251030 | A1* | 9/2016 | Okada | G06T 1/0007 |
| | | | | 345/633 |
| 2017/0017240 | A1* | 1/2017 | Sharma | B64C 39/024 |
| 2017/0023365 | A1* | 1/2017 | Hunter, Jr. | G01S 19/45 |
| 2017/0308100 | A1* | 10/2017 | Iskrev | B64C 39/024 |
| 2018/0002017 | A1* | 1/2018 | Abeles | B64C 39/024 |
| 2018/0031387 | A1* | 2/2018 | Scherer | G06T 7/579 |
| 2018/0120122 | A1* | 5/2018 | Laine | G01C 21/3647 |
| 2018/0164820 | A1* | 6/2018 | Aboutalib | B64C 3/56 |
| 2018/0224868 | A1* | 8/2018 | Lim | G01S 13/882 |
| 2018/0341007 | A1* | 11/2018 | Fetterman | G01S 13/931 |
| 2018/0374237 | A1* | 12/2018 | Karlov | G06T 7/74 |
| 2019/0009904 | A1* | 1/2019 | Winkle | B64C 39/024 |
| 2019/0072392 | A1* | 3/2019 | Haspel | G06V 20/13 |
| 2019/0138029 | A1* | 5/2019 | Ryll | G05D 1/106 |
| 2019/0197291 | A1* | 6/2019 | Zhu | B64U 70/00 |
| 2019/0213896 | A1* | 7/2019 | Gohl | G06T 5/00 |
| 2019/0302276 | A1* | 10/2019 | Sandford | G01S 17/34 |
| 2019/0383609 | A1* | 12/2019 | Simon | G01C 17/38 |
| 2020/0073385 | A1* | 3/2020 | Jobanputra | B64C 39/024 |
| 2020/0300634 | A1* | 9/2020 | Laine | G01C 21/20 |
| 2020/0312170 | A1* | 10/2020 | Sherback | G07C 5/0841 |
| 2020/0334857 | A1* | 10/2020 | Garud | B60R 1/00 |
| 2020/0341117 | A1* | 10/2020 | Sandford | G01S 17/93 |
| 2020/0349362 | A1* | 11/2020 | Maloney | G01S 5/16 |
| 2020/0393246 | A1* | 12/2020 | Zhang | G06T 7/97 |
| 2021/0034076 | A1* | 2/2021 | Saunders | G08G 5/04 |
| 2021/0103293 | A1* | 4/2021 | Li | G05D 1/0808 |
| 2021/0104162 | A1* | 4/2021 | Nykl | G08G 5/0008 |
| 2021/0109210 | A1* | 4/2021 | Kabakian | G01S 13/9004 |
| 2021/0134163 | A1* | 5/2021 | Wissler | G08G 5/0069 |
| 2021/0370972 | A1* | 12/2021 | Bagschik | B60W 50/045 |
| 2021/0375145 | A1* | 12/2021 | Wissler | G06V 10/48 |
| 2022/0057213 | A1* | 2/2022 | Singhal | G06T 7/74 |
| 2022/0136860 | A1* | 5/2022 | Dong | G01C 23/00 |
| | | | | 701/16 |
| 2022/0138981 | A1* | 5/2022 | Bortolami | G08G 5/0052 |
| | | | | 348/117 |
| 2022/0144186 | A1* | 5/2022 | Heafitz | G06T 7/277 |
| 2022/0227358 | A1* | 7/2022 | Hu | B60W 30/09 |
| 2022/0284232 | A1* | 9/2022 | Yin | G06V 10/774 |
| 2022/0392108 | A1* | 12/2022 | Garud | G06T 7/75 |
| 2023/0087890 | A1* | 3/2023 | Neuhauser | G01S 13/9027 |
| 2023/0150661 | A1* | 5/2023 | Heafitz | G06V 10/26 |
| | | | | 701/3 |

FOREIGN PATENT DOCUMENTS

| | | | | |
|---|---|---|---|---|
| WO | WO-2009118043 | A1 * | 10/2009 | ............... G01S 1/70 |
| WO | WO-2014169354 | A1 * | 10/2014 | ............... G01C 21/00 |

OTHER PUBLICATIONS

Kinnari et al. GNSS-denied geolocalization of UAVs by visual matching of onboard camera images with orthophotos (Year: 2021).*
"Position resection and intersection," retrieved from the Internet: https://en.wikipedia.org/w/index.php?title=Position_resection_and_intersection&oldid=897224443, retrieved on Sep. 8, 2021, 3 pages.
"Free stationing," retrieved from the Internet: https://en.wikipedia.org/w/index.php?title=Free_stationing&oldid=931824799, retrieved on Sep. 8, 2021, 4 pages.

* cited by examiner

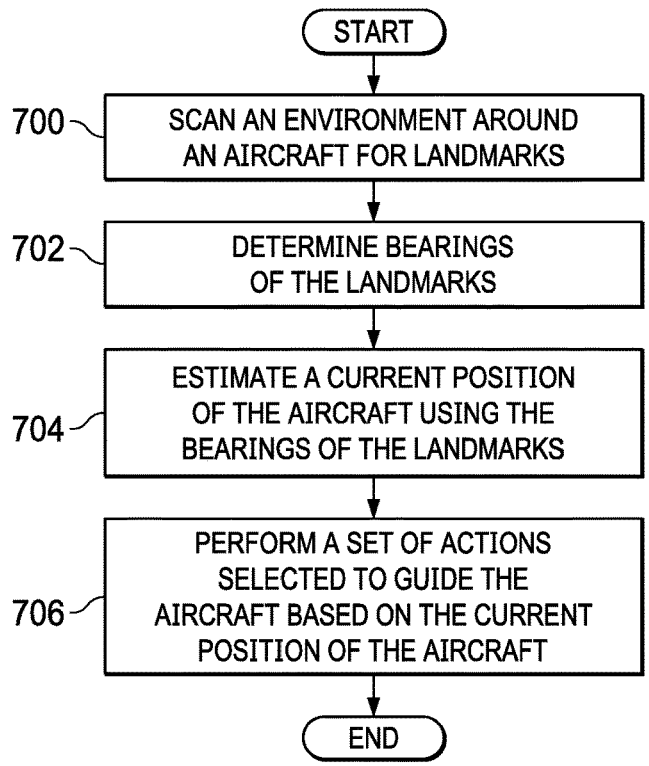
FIG. 7
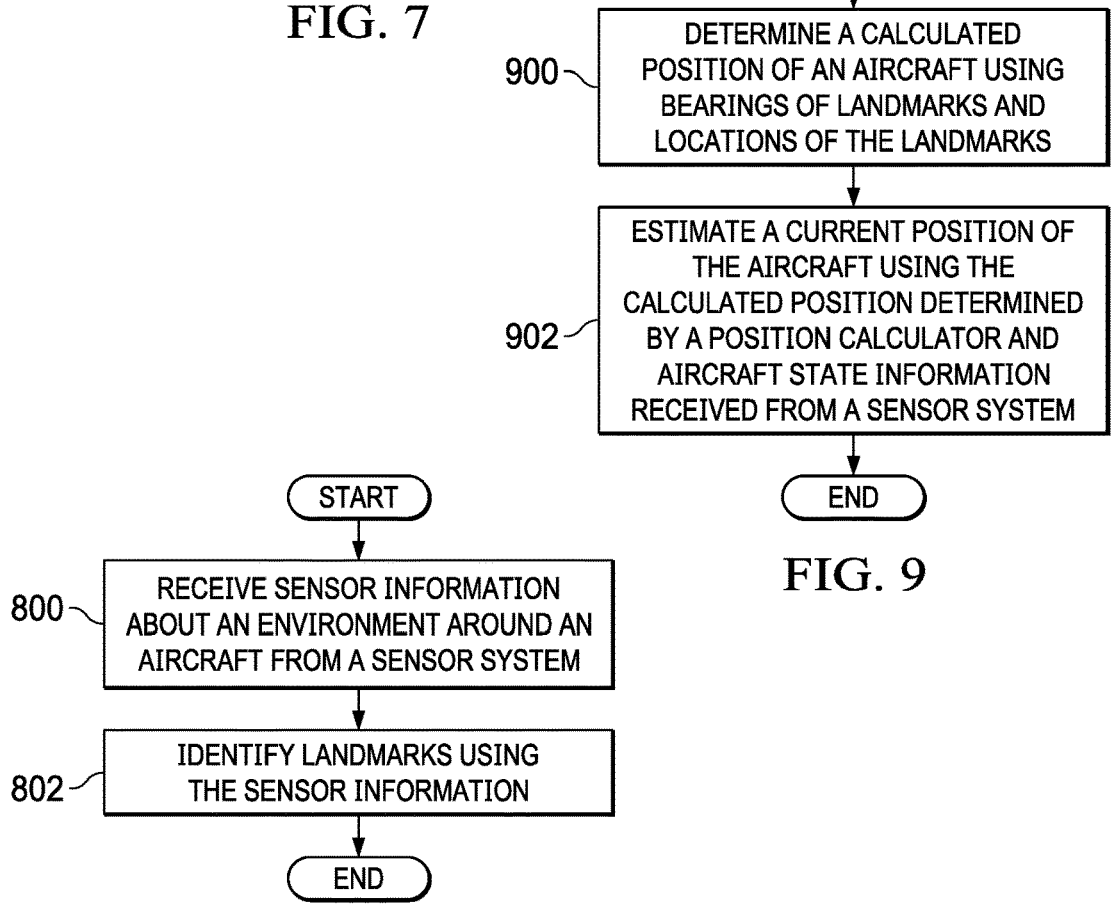
FIG. 8
FIG. 9

GLOBAL POSITIONING DENIED NAVIGATION

BACKGROUND INFORMATION

1. Field

The subject disclosure relates generally to aircraft and, in particular, to a method, apparatus, system, and computer program product for navigating an aircraft.

2. Background

Navigation of an aircraft involves ascertaining a position of the aircraft and performing operations to fly the aircraft to a location. In many aircraft, the navigation is performed by a flight management system. The flight management system can determine a position of the aircraft and calculate a course to a waypoint or destination. In other cases, a pilot can determine the course of the aircraft using a current position determined for the aircraft. Other information such as speed and direction of travel of the aircraft is used in navigating the aircraft.

The position of the aircraft is commonly determined using a global positioning system (GPS) receiver in the aircraft. When the global positioning system receiver does not provide information as needed to determine the position of the aircraft with a desired level of accuracy, the navigation becomes more challenging. For example, environmental or man-made factors can reduce or eliminate an ability of the global positioning system receiver to receive signals needed to accurately determine the position of the aircraft.

With this situation, the pilot of the aircraft may use visual navigation to roughly determine the position of the aircraft. This process requires the pilot to devote much attention to determining the location of the aircraft and is not as accurate as using the global positioning system receiver.

SUMMARY

An embodiment of the subject disclosure provides an aircraft navigation system. The aircraft navigation system comprises a sensor system, a landmark detector, a position calculator, a position estimator, and a guidance system. The sensor system is associated with an aircraft. The sensor system is configured to generate images about an environment around the aircraft. The landmark detector is configured to receive the images, identify landmarks in the environment around the aircraft using the images, and determine bearings of the landmarks and locations of the landmarks. The position calculator is configured to determine a calculated position of the aircraft using the bearings of the landmarks and the locations of the landmarks. The position estimator is configured to estimate a current position of the aircraft using the calculated position determined by the position calculator and aircraft state information. The guidance system is configured to provide a guidance to a target location using the current position of the aircraft.

Another embodiment of the subject disclosure provides an apparatus. The apparatus comprises a computer system and a navigator in the computer system. The navigator is configured to facilitate a scan of an environment around an aircraft for landmarks. The navigator is configured to determine bearings of the landmarks and locations of the landmarks. The navigator is configured to estimate a current position of the aircraft using the bearings of the landmarks and the locations of the landmarks. The navigator is configured to initiate a performance of a set of actions selected to guide the aircraft based on the current position of the aircraft.

Yet another embodiment of the subject disclosure provides a method for navigating an aircraft. Information indicative of a result of a scan of an environment around the aircraft is received by a computer system for landmarks. Bearings of the landmarks and locations of the landmarks are determined by the computer system. A current position of the aircraft is estimated by the computer system using the bearings of the landmarks and the locations of the landmarks. A set of actions to be performed is determined to guide the aircraft based on the current position of the aircraft is performed by the computer system.

Still another embodiment of the subject disclosure provides a computer program product for navigating an aircraft. The computer program product comprises a computer-readable storage media first program code, second program code, third program code, and fourth program code stored on the computer-readable storage media. The first program code is executed to cause a computer system to receive information indicative of a result of a scan of an environment around the aircraft for landmarks. The second program code is executed by the computer system to cause the computer system to determine bearings of the landmarks and locations of the landmarks. The third program code is executed to cause the computer system to estimate a current position of the aircraft using the bearings of the landmarks and the locations of the landmarks. The fourth program code is executed to cause the computer system to determine a set of actions that are to be performed to guide the aircraft based on the current position of the aircraft.

The features and functions can be achieved independently in various embodiments of the subject disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the subject disclosure when read in conjunction with the accompanying drawings, wherein:

FIG. 7 is an illustration of a flowchart of a process for navigating an aircraft in accordance with an illustrative embodiment;

FIG. 8 is an illustration of a flowchart of a process for scanning an environment for landmarks in accordance with an illustrative embodiment;

FIG. 9 is an illustration of a flowchart of a process for estimating a current position of an aircraft in accordance with an illustrative embodiment;

DETAILED DESCRIPTION

Figure 1:
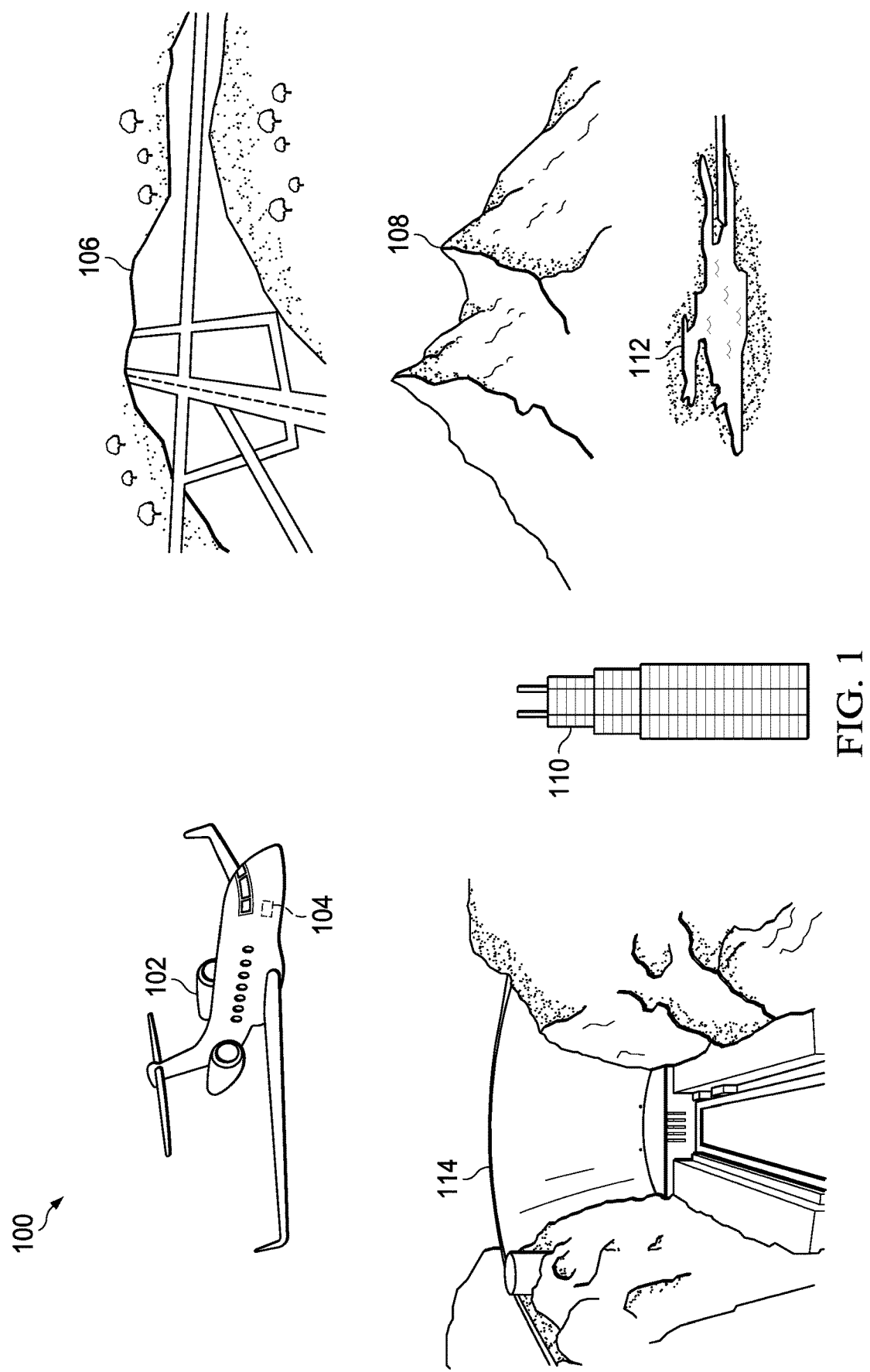
FIG. 1 is a pictorial illustration of a navigation environment in accordance with an illustrative embodiment.

The illustrative embodiments recognize and take into account one or more different considerations. The illustrative embodiments recognize and take into account that an inability to obtain information, such as global positioning system signals, can occur in response to passive or active interference. The illustrative embodiments recognize and take into account that the passive interference may occur through environmental factors that may block or reduce the strength of global positioning signals reaching a global positioning system receiver. The illustrative embodiments recognize and take into account that the active interference may include devices operating to block or jam signals. Additionally, the illustrative embodiments recognize and take into account that the active interference may also include spoofing for sending false information in the signals to the global positioning system receiver.

The illustrative embodiments recognize and take into account that unmanned aerial vehicles (UAVs), also referred to as unmanned aerial systems (UASs), employ navigation systems that operate using global positioning system signals. The illustrative embodiments recognize and take into account that these unmanned aerial systems use nearly continuous contact with a control station.

The illustrative embodiments recognize and take into account that an event in which an unmanned aerial system loses at least one of a global positioning system signal or contact with the control station, a contingency situation outside of normal operating procedures is present. As a result, the illustrative embodiments recognize and take into account that actions can be taken to ensure safe operation of the unmanned aerial system.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The illustrative embodiments recognize and take into account that these actions can include flying in a route or pattern over a previously known location. The illustrative embodiments recognize and take into account that, depending on the amount of time needed to correct the problem, the aircraft may be unable to recover and may land or terminate flight.

Thus, the illustrative embodiments provide a method, apparatus, system, and computer program product for navigating an aircraft. In one illustrative example, a computer system scans an environment around an aircraft for landmarks. The computer system determines bearings of the landmarks and locations of the landmarks. A current position of the aircraft is estimated by the computer system using the bearings of the landmarks and the locations of the landmarks. The computer system performs a set of actions selected to guide the aircraft based on the current position of the aircraft.

As used herein, a "set of," when used with reference to items, means one or more items. For example, a "set of actions" is one or more actions.

With reference now to the figures and, in particular, with reference to FIG. 1, a pictorial illustration of a navigation environment is depicted in accordance with an illustrative embodiment. As depicted, navigation environment 100 is an environment in which airplane 102 is in flight. In this illustrative, airplane 102 is unable to determine its position with a desired level of accuracy using a global positioning system receiver (not shown) in airplane 102.

For example, airplane 102 may be unable to detect global positioning system signals from satellites that have been attenuated by conditions such as ice covering an antenna for a global positioning system receiver. As another example, solar storms or solar flares can also interfere with the global positioning system receiver. In other illustrative examples, active interference can cause airplane 102 to be unable to determine its position using the global positioning system receiver.

In this situation, airplane 102 can determine its current position and perform navigation activities using an alternative mechanism. In this illustrative example, navigation system 104 in airplane 102 can determine a current position of airplane 102 when the global positioning system receiver in airplane 102 does not provide the current position with a desired level of accuracy.

In this illustrative example, navigation system 104 can generate images about the environment around airplane 102. These images can be used by navigation system 104 to identify landmarks in the environment around airplane 102.

Landmarks can take a number of different forms. In this depicted example, the landmarks identified by navigation system 104 include airfield 106, mountain 108, building 110, lake 112, and dam 114.

In this illustrative example, navigation system 104 determines a bearing of each one of these landmarks. Further, navigation system 104 can also estimate a distance to each of the landmarks.

Navigation system 104 can estimate the current position of airplane 102 using bearings of the landmarks and the locations of the landmarks. In this example, navigation system 104 measures the bearings to the landmarks and identifies landmark locations for the landmarks from information about the landmarks stored in a landmark data store. As depicted, a landmark is identified by navigation system 104 and the identification of the landmarks is used to determine the locations of the landmarks from the landmark data store.

In this illustrative example, navigation system 104 can determine a set of actions that are selected to guide airplane 102 based on the current position determined for airplane 102. These actions can include creating a route, setting a waypoint, setting a heading, changing an altitude, and/or some other action with respect to airplane 102.

Figure 2:
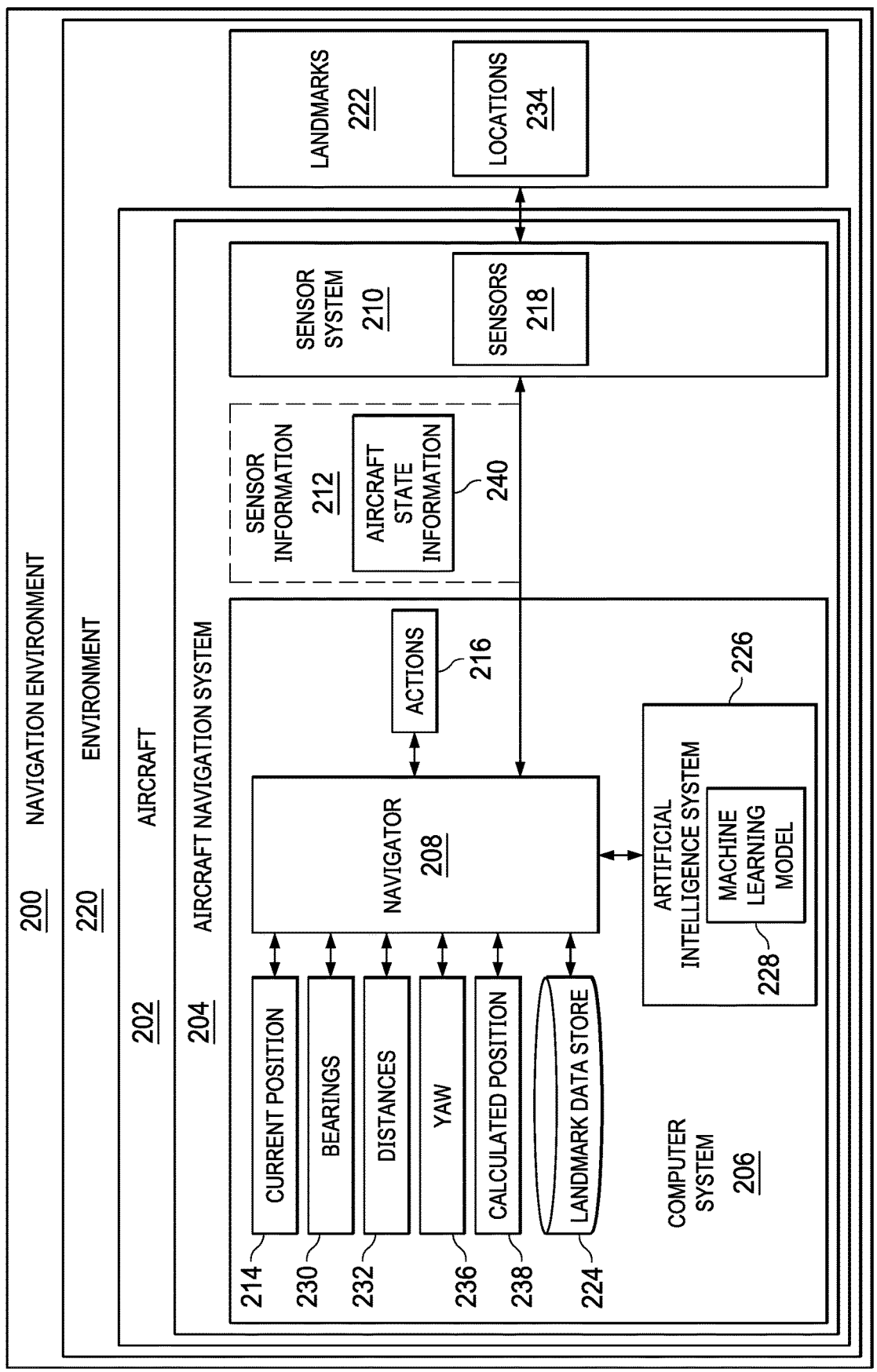
FIG. 2 is an illustration of a block diagram of a navigation environment in accordance with an illustrative embodiment.

With reference now to FIG. 2, an illustration of a block diagram of a navigation environment is depicted in accordance with an illustrative embodiment. Navigation environment 100 in FIG. 1 is an example of one implementation of components in navigation environment 200 in FIG. 2.

As depicted, aircraft 202 operates in navigation environment 200. In this illustrative example, aircraft 202 is selected from one of an airplane, a rotorcraft, an unmanned aerial vehicle, an unmanned aerial system, a manned aerial vehicle, a commercial aircraft, a military aircraft, and other suitable types of aircraft.

Aircraft 202 includes aircraft navigation system 204. Aircraft navigation system 204 is configured to perform a set of actions 216 to aid in navigating aircraft 202. In this illustrative example, aircraft navigation system 204 comprises computer system 206, navigator 208, and sensor system 210. As depicted, navigator 208 is located in computer system 206.

Navigator 208 can be implemented in software, hardware, firmware, or a combination thereof. When software is used, the operations performed by navigator 208 can be implemented in program code configured to run on hardware, such as a processor unit. When firmware is used, the operations performed by navigator 208 can be implemented in program code and data and stored in persistent memory to run on a processor unit. When hardware is employed, the hardware can include circuits that operate to perform the operations in navigator 208.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 206 is a physical hardware system and includes one or more data processing systems. When more than one data processing system is present in computer system 206, those data processing systems are in communication with each other using a communications medium. The communications medium can be a network. The data processing systems can be selected from at least one of a computer, a server computer, a tablet computer, or some other suitable data processing system.

In this illustrative example, sensor system 210 generates sensor information 212 that can be used by navigator 208 to determine current position 214 of aircraft 202 and perform a set of actions 216. Sensor system 210 can take a number of different forms. For example, sensor system 210 can include a set of sensors 218 that generate sensor information 212 needed to determine current position 214.

As used herein, a position for aircraft 202 is the location of the aircraft in three dimensions. For example, the location can be a latitude, a longitude, and an altitude. Further, the position can also include an orientation of aircraft 202. This orientation can be described as a heading. The heading can also be referred to as a yaw for aircraft 202. Thus, current position 214 comprises at least the location of aircraft 202 and can also include a heading of aircraft 202.

The set of sensors 218 can be selected from at least one of a camera, a visible light camera, a hyperspectral sensor, a light detection and ranging (LiDAR) system, a synthetic aperture radar (SAR) system, a laser scanner system, or other suitable types of sensors. Additionally, the set of sensors 218 in sensor system 210 can also include other types of sensors such as a barometric altimeter, an accelerometer, an angled attack sensor, or other suitable sensors that may be used in aircraft 202.

In this illustrative example, navigator 208 is configured to perform a number of different operations. As depicted, navigator 208 can scan environment 220 around aircraft 202 for landmarks 222. In scanning environment 220, navigator 208 can look at all parts of environment 220 around aircraft 202.

For example, navigator 208 can receive sensor information 212 generated by sensor system 210 about environment 220 around aircraft 202 to scan environment 220 for landmarks 222. Sensor information 212 can be used to identify landmarks 222 in environment 220. Further, navigator 208 can control sensor system 210 to direct scanning of environment 220.

A landmark in landmarks 222 is a recognizable natural or artificial feature that can be used for navigation. In this illustrative example, a feature that is a landmark is a feature that stands out in the environment and can often be visible from long distances. For example, landmarks 222 can be selected from at least one of a natural feature, an artificial feature, a mountain, a plateau, a tree, a lake, a pond, a river, an ocean, a field, a building, an antenna, an airfield, a runway, a road, a quarry, a bridge, a manufacturing facility, a dam, a radio tower, a monument, or some other suitable feature in environment 220.

In this illustrative example, landmarks 222 can be identified from sensor information 212 in a number of different ways. For example, navigator 208 can identify landmarks 222 using sensor information 212 and landmark information stored in landmark data store 224. Landmark data store 224 comprises a collection of the landmark information that identifies landmarks 222 based on particular attributes for a particular landmark or other information. These attributes can be located in images, measurements, descriptions, or other forms of data structures. In some illustrative examples, the collection of information can include nautical maps.

Navigator 208 can also access or include artificial intelligence system 226. Artificial intelligence system 226 can include machine learning model 228 which has been trained to identify landmarks 222 from sensor information 212. The data sets for these landmarks can be selected from various sources, such as aeronautical charts, geographic maps, images, and other sources of information identifying the landmarks and their locations.

As depicted, artificial intelligence system 226 is a system that has intelligent behavior and can be based on the function of a human brain. Artificial intelligence system 226 comprises at least one of an artificial neural network, a cognitive system, a Bayesian network, a fuzzy logic, an expert system, a natural language system, or some other suitable system. Machine learning is used to train artificial intelligence system 226. Machine learning involves inputting data to the process and allowing the process to adjust and improve the function of artificial intelligence system 226.

In this illustrative example, machine learning model 228 is a type of artificial intelligence model that can learn without being explicitly programmed. Machine learning model 228 can learn based on training data input into machine learning model 228. This data can be in the form of datasets. As depicted, machine learning model 228 can learn using various types of machine learning algorithms.

The machine learning algorithms include at least one of a supervised learning, an unsupervised learning, a feature learning, a sparse dictionary learning, an anomaly detection, association rules, or other types of learning algorithms. Examples of machine learning models include an artificial neural network, a decision tree, a support vector machine, a Bayesian network, a genetic algorithm, and other types of models. These machine learning models can be trained using data and process additional data to provide a desired output.

For example, in scanning environment 220 around aircraft 202, navigator 208 can receive images from a camera system in sensor system 210 for aircraft 202. Navigator 208 can identify landmarks 222 in the images using machine learning model 228 and artificial intelligence system 226. In some illustrative examples, a machine learning model can be trained to detect a particular type of landmark. For example, one machine learning model can be trained to detect mountains while another machine learning model can be trained to detect cities. Machine learning model 228 can detect the landmarks in the images and determine bearings 230 and locations 234 of landmarks 222.

In this illustrative example, navigator 208 can determine bearings 230 of landmarks 222 and locations 234 of landmarks 222. Bearings 230 can be absolute or relative. An absolute bearing refers to the angle between magnetic north or true north and an object such as a landmark. A relative bearing refers to the angle between the heading of aircraft 202 and the location of another object, such as a landmark. The heading can also be referred to as the yaw of the aircraft. In this illustrative example, distances 232 to landmarks 222 can be determined using bearings 230, landmarks 222, and locations 234 of landmarks 222. Locations 234 can be determined from landmark data store 224. In this illustrative example, distances 232 are optional measurements and can be available in sensor information 212 from sensors 218.

In this illustrative example, navigator 208 can estimate current position 214 of aircraft 202 using bearings 230 of landmarks 222 and locations 234 of landmarks 222. Further, navigator 208 can also estimate yaw 236 using bearings 230 and locations 234. These estimates can be formed using bearings 230 and distances 232 as inputs into at least one of a Hough transform, a maximum likelihood estimate, a probability convolution, a Bayesian estimation, a machine learning model, or some other process or system.

In the illustrative example, estimating current position 214 using bearings 230 of landmarks 222 and locations 234 of landmarks 222 can be performed indirectly in the estimation. For example, navigator 208 can determine calculated position 238 of aircraft 202 using bearings 230 of landmarks 222 and locations 234 of landmarks 222. Navigator 208 can then estimate current position 214 of aircraft 202 using calculated position 238 and aircraft state information 240 from sensor system 210.

In this illustrative example, aircraft state information 240 is a type of sensor information 212. Aircraft state information 240 is information that describes the state of aircraft 202 during flight. Aircraft state information 240 can be for at least one of a current state of aircraft 202 or a prior state of aircraft 202.

Aircraft state information 240 can include at least one of an airspeed, a barometric altitude, a rate of acceleration, a magnetic heading, a pitch, a roll, a vertical speed, a pitch rate, an angle of attack, a VOR derived position, or other suitable information that can describe the state of aircraft 202. Aircraft state information 240 can include the position and heading of aircraft 202. Further, at least one of current position 214 or calculated position 238 can be aircraft state information 240.

Further, navigator 208 can perform a set of actions 216 selected to guide aircraft 202 based on current position 214 of aircraft 202. In this illustrative example, the set of actions 216 can include at least one of selecting a target location for aircraft 202, generating a waypoint command to change a heading of aircraft 202 to reach the target location, generating an altitude command to change an altitude of aircraft 202, generating a flight plan to reach the target location, displaying the heading for aircraft 202 on a graphical user interface in a display system, or other suitable actions.

These different operations can be initiated when current systems used to determine current position 214 are unable to perform with a defined level of accuracy. For example, navigator 208 can initiate scanning of environment 220 around aircraft 202 for landmarks 222; determine bearings 230 of landmarks 222 and locations 234 of landmarks 222; estimate current position 214 of aircraft 202 using bearings 230 of landmarks 222 and locations 234 to landmarks 222; and perform the set of actions 216 selected to guide aircraft 202 based on current position 214 of aircraft 202 when current position 214 of aircraft 202 cannot be determined with a desired level of accuracy using a global positioning system receiver in aircraft 202.

In one illustrative example, one or more technical solutions are present that overcome a technical problem with determining a current position of an aircraft when navigation systems normally used to make these determinations are not operating or cannot provide the current position with a desired level of accuracy. As a result, one or more technical solutions can provide a technical effect of providing the current position of the aircraft based on sensor information such as images of landmarks. Computer system 206 can be configured to perform at least one of the steps, operations, or actions described in the different illustrative examples using software, hardware, firmware, or a combination thereof. As a result, computer system 206 operates as a special purpose computer system in which navigator 208 in computer system 206 enables navigating aircraft 202 when normally used navigation systems are unable to operate as desired. In particular, navigator 208 transforms computer system 206 into a special purpose computer system as compared to currently available general computer systems that do not have navigator 208.

In the illustrative example, the use of navigator 208 in computer system 206 integrates processes into a practical application for a method for navigating an aircraft that increases the performance of computer system 206. In other words, navigator 208 in computer system 206 is directed to a practical application of processes integrated into navigator 208 in computer system 206 that enables navigating aircraft 202 when normally relied-on systems for navigation are not operating as desired. In this illustrative example, navigator 208 in computer system 206 scans an environment around aircraft 202 for landmarks 222; determines bearings 230 of landmarks 222 and locations 234 of landmarks 222; estimates current position 214 of aircraft 202 using bearings 230 of landmarks 222 and locations 234 of landmarks 222; and performs a set of actions 216 selected to guide aircraft 202 based on current position 214 of aircraft 202. The operation of computer system 206 is to determine current position 214 of aircraft 202 when normally used sensors 218, such as a global positioning system receiver, are unable to provide current position 214.

Figure 3:
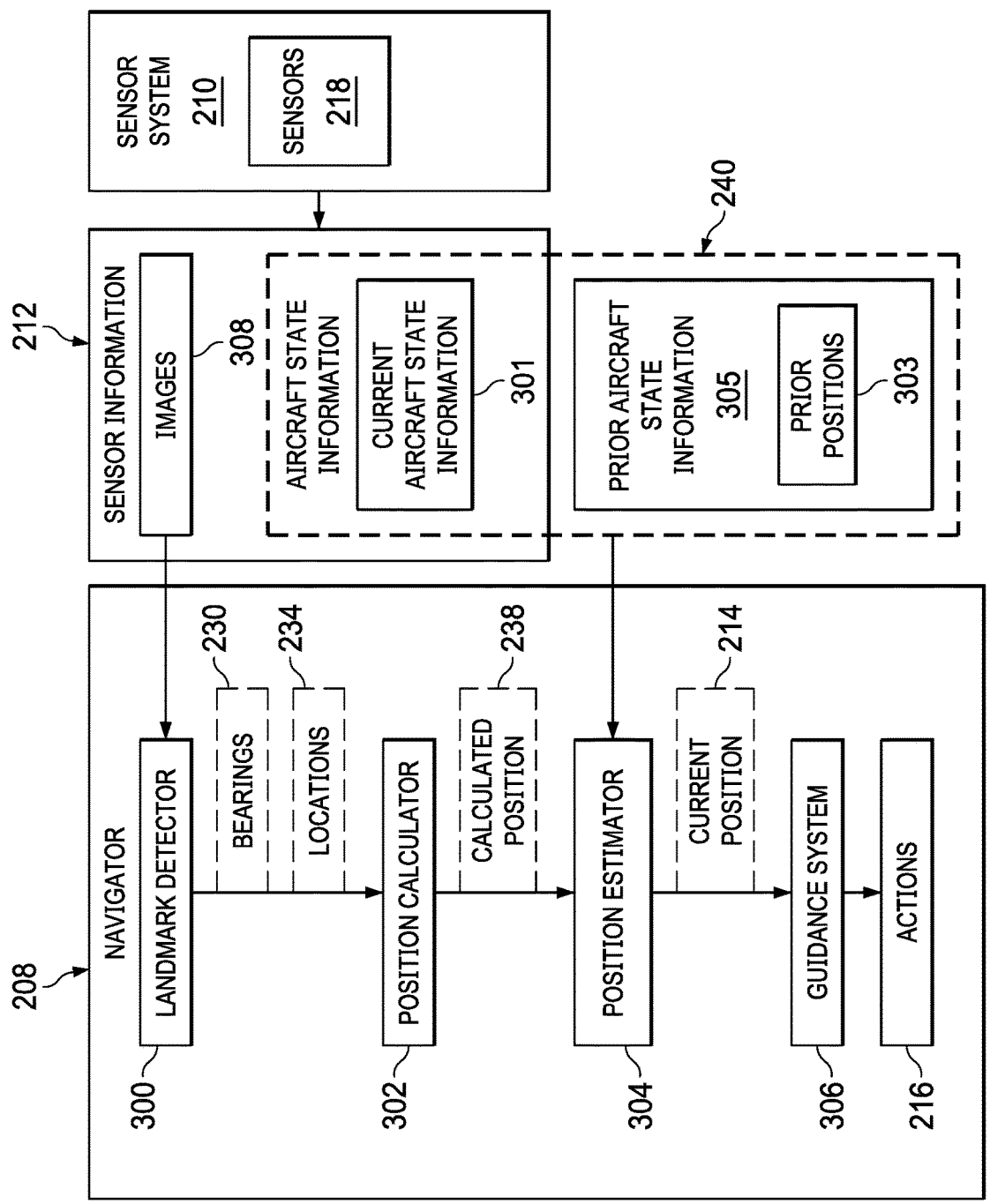
FIG. 3 is an illustration of a block diagram of a navigator in accordance with an illustrative embodiment.

With reference next to FIG. 3, an illustration of a block diagram of a navigator is depicted in accordance with an illustrative embodiment. In the illustrative examples, the same reference numeral may be used in more than one figure. This reuse of a reference numeral in different figures represents the same element in the different figures.

An example implementation for navigator 208 in FIG. 2 is depicted in FIG. 3. In this illustrative example, navigator 208 comprises landmark detector 300, position calculator 302, position estimator 304, and guidance system 306

As depicted, landmark detector 300 receives images 308 in sensor information 212 from sensor system 210. Landmark detector 300 can operate to identify landmarks 222 in environment 220 around aircraft 202 in FIG. 2. Further, landmark detector 300 can determine bearings 230 of landmarks 222 and locations 234 of landmarks 222 from aircraft 202.

With the identification of landmarks 222, position calculator 302 can determine calculated position 238 of aircraft 202 using bearings 230 and locations 234 received from landmark detector 300. Position estimator 304 can estimate current position 214 of aircraft 202 using calculated position 238 as determined by position calculator 302 and aircraft state information 240 received from sensor system 210.

For example, adjustments can be made to calculated position 238 based on aircraft state information 240. For example, inertial position of the aircraft from an inertial measurement unit, inferential velocity, altitude, and other aircraft state information 240 can be used to adjust calculated position 238 to form an estimate for current position 214 for aircraft 202 in FIG. 2.

For example, a set of prior positions 303 for aircraft 202 can be used by position calculator 302 to calculate calculated position 238. These propositions can be, for example, a position generated by a global positioning system receiver, a prior calculated position, a prior current position, or some other prior position accessible by position estimator 304. In this example, the set of prior positions 303 is prior aircraft state information 305.

When aircraft state information 240 is prior aircraft state information 305 in the form of prior positions 303, this aircraft state information can be stored in a data structure such as a flat file, a database, a linked list, a table, a spreadsheet, or some other data structure in a memory or other hardware storage device accessible by navigator 208. In this example, at least one of calculated position 238 or current position 214 can be stored as prior positions 303 for prior aircraft state information 305.

When a set of prior positions 303 in aircraft state information 240 is used by position estimator 304 to estimate current position 214 from calculated position 238, position estimator 304 can use a process or filter, such as a Kalman filter, in which calculated position 238 and the set of prior positions 303 are inputs into the Kalman filter to estimate current position 214. When the set of prior positions 303 are prior current positions estimated from prior calculated positions, the set of prior positions 303 are fed back into the Kalman filter in position estimator 304 as part of a feedback loop.

For example, calculated position 238 can be determined by position calculator 302 using radio signals in aircraft state information 240 received from Very High Frequency (VHF) Omni-Directional Range (VOR) transmitters and a magnetic heading of aircraft 202 in aircraft state information 240 received from a magnetometer. This and/or other aircraft state information received from sensor system 210 in real-time is current aircraft state information 301.

The determination of current position 214 by position estimator 304 using calculated position 238 and current aircraft state information 301 can be also performed using a Kalman filter. The position determined from the VOR signals and the magnetic heading can be corrected using various estimation algorithms that take into account an amount of error between the positions.

In still other illustrative examples, current aircraft state information 301 used by position estimator 304 can also include information from inertial measurement unit, accelerometers, and other suitable sensors that can provide information needed to adjust calculated position 238 to estimate current position 214.

In yet other illustrative examples, both current aircraft state information 301 and prior aircraft state information 305 can be used by position estimator 304 to estimate current position 214 from calculated position 238.

With current position 214, guidance system 306 can perform a set of actions 216 to provide guidance to a target location using current position 214 of aircraft 202 in FIG. 2. In this manner, navigator 208 can enable a pilot or other operator of aircraft 202 to fly aircraft 202 without having to visually determine what direction to fly in, what altitude to fly at, or some other parameter for continuing navigation of aircraft 202 when other systems are unable to provide a desired level of accuracy in determining current position 214 such that aircraft 202 can be flown to a desired location or along desired waypoints.

In this illustrative example, when guidance system 306 provides waypoints for guidance, the guidance for the waypoints may be updated over longer time periods as compared to currently used waypoint guidance, which is performed at a rate of up to multiple iterations per second. With the manner in which current position 214 is determined, guidance system 306 can take into account that the amount of error is larger as compared to current systems and may have a larger error in position. As a result, guidance system 306 can provide the waypoints for heading changes based on larger errors concurrently used.

Guidance system 306 can operate in a manner that takes into account that an update rate of current position 214 is slower as compared to when a global positioning system receiver is used. For example, the update rate of 0.1 Hz may occur.

In this example, a vector field methodology can be implemented to converge to a waypoint path. The path for the aircraft can be determined with the waypoint path using a route planner to arrive at a desired location, or manually-generated waypoints. Waypoint paths in this case are three-dimensional. A two-dimensional flight plan can also be generated manually or automatically. Altitude clearances from an air traffic management entity can be used to give altitude commands during flight.

Further, update criteria, such as a threshold, can be implemented in the heading or position error to cause an update to be performed periodically. As a result, guidance system 306 can perform actions 216 to provide updates and guidance based on the update rate and heading or position error.

Navigator 208 can automatically identify current position 214 when other systems are unable to provide current position 214 with a desired level of accuracy. Navigator 208 can provide current position 214 with a desired level of accuracy that is greater than possible by a pilot or other human operator within the timeframe needed to operate aircraft 202 with a desired level of accuracy. Further, navigator 208 enables a pilot or human operator of aircraft 202 to focus on other actions by automatically performing actions 216 such as suggesting a bearing, automatically changing the bearing of aircraft 202, setting a waypoint, suggesting an altitude change, automatically initiating an altitude change, or some other suitable action or combination of actions.

Figure 4:
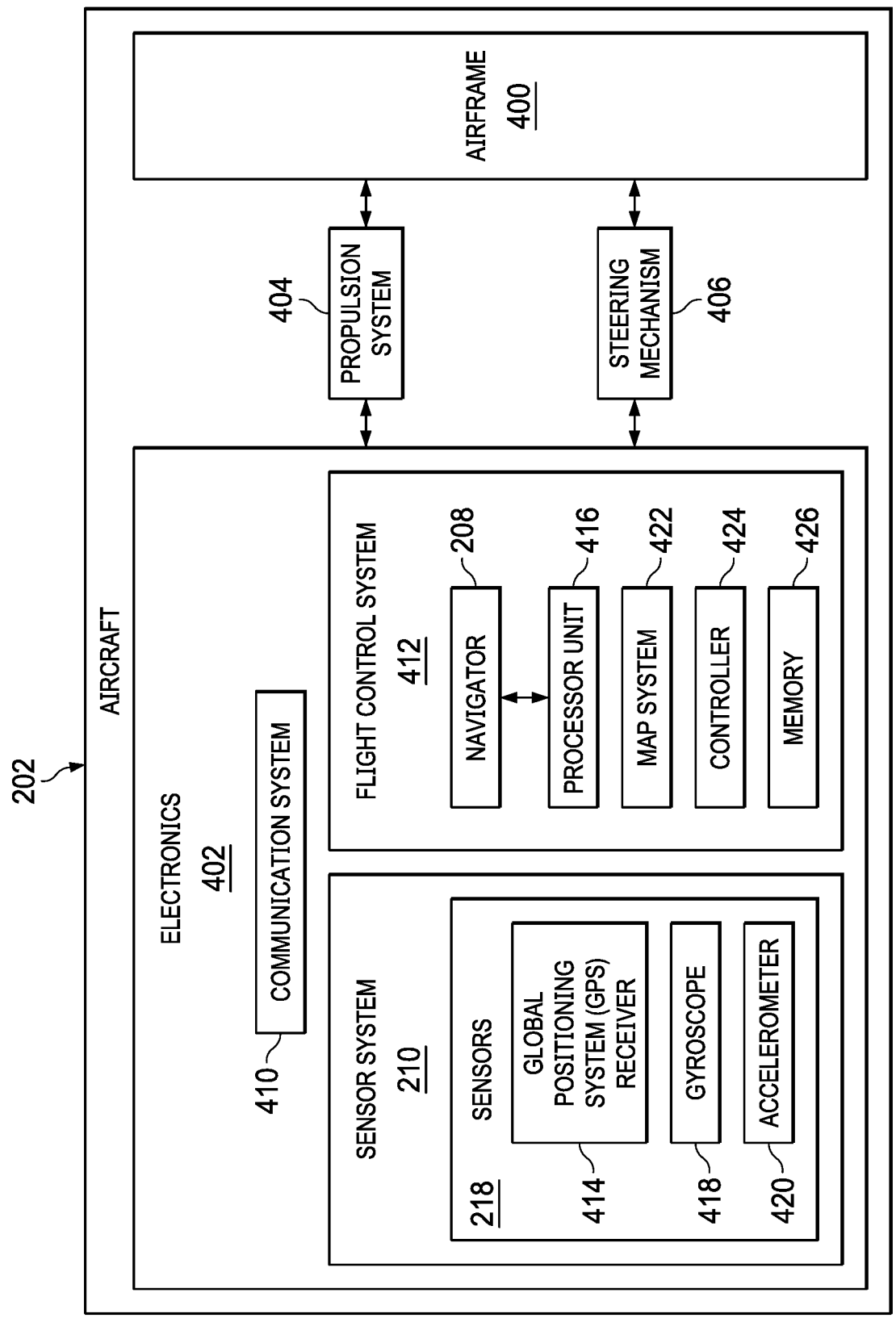
FIG. 4 is an illustration of a block diagram of an aircraft in accordance with an illustrative embodiment.

FIG. 4 is an illustration of a block diagram of an aircraft depicted in accordance with an illustrative embodiment. This figure illustrates examples of components for aircraft 202 in FIG. 2.

In this illustrative example, aircraft 202 includes airframe 400, electronics 402, propulsion system 404, and steering mechanism 406. Airframe 400 is a mechanical structure for aircraft 202. Airframe 400 can include, for example, a fuselage, an undercarriage, wings, landing gear, and other physical structures. In this illustrative example, airframe 400 carries electronics 402, propulsion system 404, and steering mechanism 406.

Electronics 402 has a number of different components. As depicted, electronics 402 include sensor system 210, communication system 410, and flight control system 412.

In this illustrative example, sensor system 210 includes global positioning system (GPS) receiver 414, gyroscope 418, accelerometer 420, and other suitable sensors. In this example, global positioning system receiver 414 is a physical system and can determine a position of aircraft 202. Global positioning system receiver 414 can include any currently used global positioning system hardware, including conventional, satellite-based systems as well as other systems using beacons, positional signals, or other sources of positioning information.

As depicted, gyroscope 418 is a physical device configured to detect rotation of aircraft 202. Gyroscope 418 can communicate with the other components in flight control system 412 to control operation of aircraft 202 and navigate aircraft 202 along a flight path. Gyroscope 418 can generate information that identifies an orientation of aircraft 202.

In the illustrative example, accelerometer 420 is a physical device configured to detect a linear motion of aircraft 202. Accelerometer 420 can include currently used accelerometers and can communicate with the components in flight control system 412 to control operation of aircraft 202 and navigate aircraft 202 along a flight path.

As depicted, propulsion system 404 is a physical system that generates a force to move aircraft 202. In the illustrative example, the force takes the form of thrust. Propulsion system 404 can include at least one of a jet engine, a turbofan, a turboprop, a ramjet, a rotor system, or some other suitable engine or device that can move aircraft 202.

In this illustrative example, steering mechanism 406 can be configured to steer aircraft 202 on a flight path to reach an objective. Steering mechanism 406 can be operated autonomously or under manned control. In this illustrative example, steering mechanism 406 responds to signals from controller 424 in flight control system 412, which may employ feedback or other control systems to direct aircraft 202 along a flight path.

As depicted, communication system 410 is a physical device and may be, for instance, a wireless transceiver and antenna. Communication system 410 can exchange information with a remote computer system. Communication system 410 can operate to send and receive information to a remote location such as another aircraft or a ground station.

As depicted, flight control system 412 can determine one or more flight paths for aircraft 202 to reach a desired location based upon signals received from the components of a navigation system. Flight control system 412 can calculate, generate, and send navigation commands, such as data signals, to steering mechanism 406 to direct aircraft 202 along a flight path.

In this illustrative example, flight control system 412 includes a number of components. As depicted, flight control system 412 includes map system 422, controller 424, processor unit 416, navigator 208, and memory 426.

As depicted, map system 422 can be part of a map-based flight control system that provides positional information about natural and manmade features within a region. Map system 422 can communicate with other components in flight control system 412 to support navigation of aircraft 202. While this function can include providing map information for calculation of routes, this function can also include independent navigational capabilities.

For example, map system 422 can provide a map-based navigation system that stores a map of an operating environment including one or more objects. The map-based navigation system may be coupled to cameras and configured to determine a position of a vehicle by comparing stored objects to a visible environment, which may provide position data in the absence of global positioning system data or other positional information.

In this illustrative example, processor unit 416 is a physical device and can be in communication with controller 424, other components in flight control system 412, steering mechanism 406, sensor system 210, navigator 208, and the other various other components, systems, and subsystems that may be present in aircraft 202. Processor unit 416 can be an internal processor in a computer system such as computer system 206 in FIG. 2 to support the various functions such as navigational functions or image processing functions. Processor unit 416 can be configured to control operation of at least one of aircraft 202, flight control system 412, sensor system 210, and navigator 208.

As depicted, processor unit 416 can perform processing and calculation functions to support at least one of navigating, generating images, displaying a pattern on a featureless surface, or processing images to generate models. Processor unit 416 may include a number of different processors cooperating to perform the operations for navigator 208 in FIG. 2 described herein. For example, an internal processor in aircraft 202 controls operation of aircraft 202 while another processor assigned to navigator 208 controls estimating current position 214 for aircraft 202 when global positioning system receiver 414 is unable to determine current position 214 with a desired level of accuracy.

Controller 424 can operate to control components in aircraft 202 such as flight control system 412, sensor system 210, propulsion system 404, or steering mechanism 406. Controller 424 is in communication with processor unit 416, aircraft 202, flight control system 412, sensor system 210, steering mechanism 406, and the other various components of the devices and systems described herein.

As depicted, controller 424 can include any hardware, software, or some combination thereof for controlling the various components in aircraft 202 and flight control system 412 described herein, including, without limitation, microprocessors, microcontrollers, application-specific integrated circuits, programmable gate arrays, and any other digital and/or analog components, as well as combinations thereof, along with inputs and outputs for communicating control signals, drive signals, power signals, sensor signals, and other suitable types of signals.

In this illustrative example, memory 426 is a physical device and can include local memory or a remote storage device that stores a log of data for flight control system 412, including, without limitation, sensor information 212 including aircraft state information 240 of FIG. 2 generated by sensor system 210. Other information that can be stored in memory 426 includes at least one of orientations, speeds, flight paths, steering specifications, global positioning system coordinates, sensor readings, and other suitable information. The information stored in memory 426 can be accessed by at least one of processor unit 416 or controller 424 in this example.

Although a particular arrangement of components is illustrated in FIG. 4, the arrangement of components may vary in other illustrative examples. For example, sensor system 210 can be located in or on aircraft 202. Further, at least one of sensor system 210, flight control system 412, or communication system 410 can share components, such as memory, sensors, processors, or controllers. Additionally, one or more of sensors 218 in sensor system 210 can be removably coupled to aircraft 202 or components in this module can be integrated into airframe 400 for aircraft 202 in any desired manner.

Flight control system 412 may also include the components described above as being part of electronics 402, as well as other sensors in sensor system 210. As another example, other sensors can also include other flight instrumentation, sensors, processing circuitry, communications circuitry, an optical system including cameras and other sensors that are necessary or useful for operation of an unmanned aerial system, or other autonomously or manually piloted aircraft. Thus, the arrangement of the various components may be configured as desired by the designer or operator and therefore should not be limited to a particular example described or illustrated herein.

The illustrations of navigation environment 200 and the different components in FIGS. 2-4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, computer system 206 is depicted as being located in aircraft 202. In some illustrative examples, computer system 206 can be in a remote location to aircraft 202. In yet other illustrative examples, computer system 206 can be distributed and can be located in aircraft 202 and in one or more remote locations.

In yet another example, sensor system 210 can be considered a separate component from aircraft navigation system 204. As another example, other sensors in sensor system 210 can also include at least one of an inertial measurement unit, a magnetometer, a barometric altitude sensor, a Very High Frequency (VHF) omnidirectional range receiver, or some other suitable type of sensor.

Figure 5:
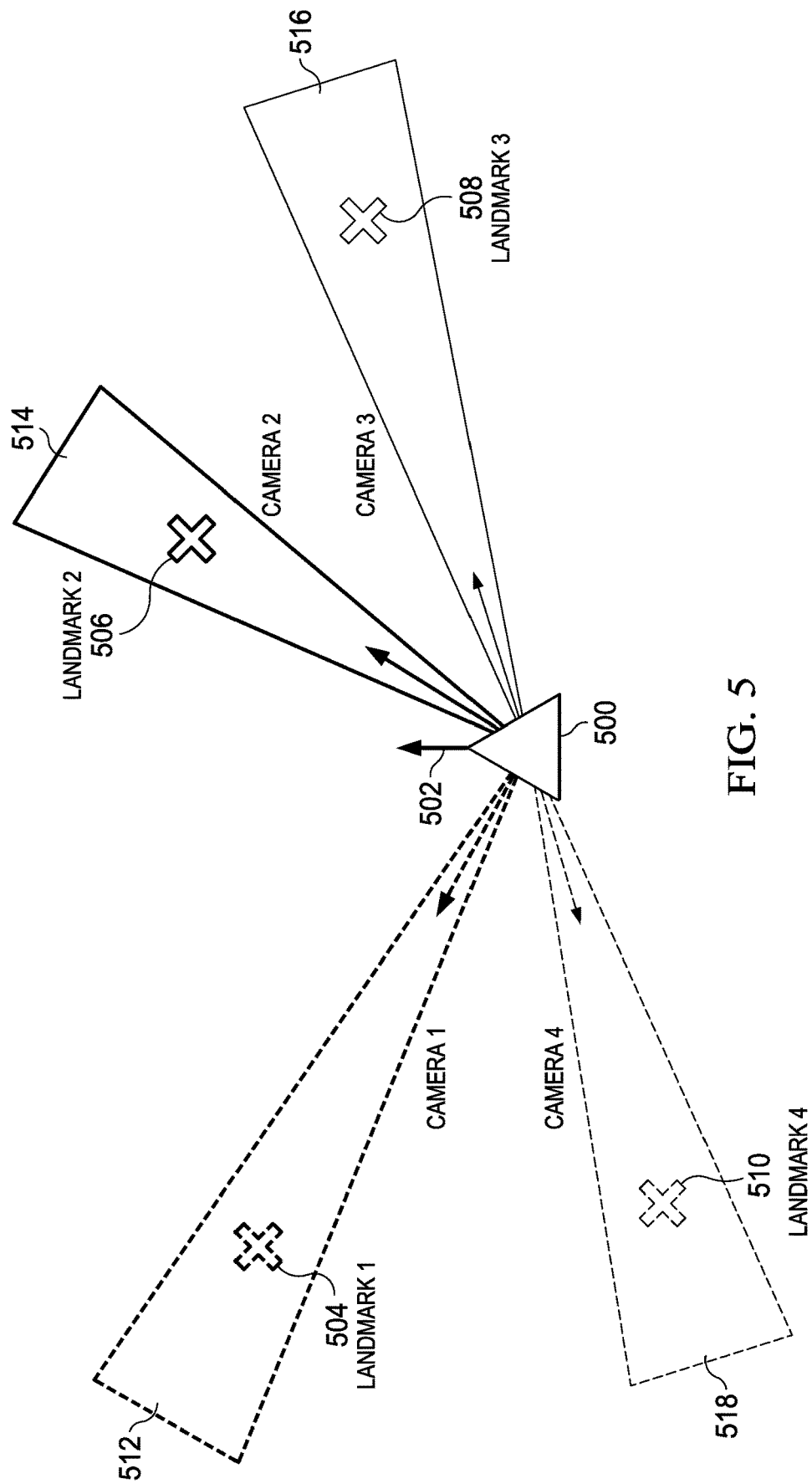
FIG. 5 is an illustration of bearings of landmarks from an aircraft in accordance with an illustrative embodiment.

With reference next to FIG. 5, an illustration of bearings of landmarks from an aircraft is depicted in accordance with an illustrative embodiment. In this illustrative example, aircraft 500 is traveling in the direction of arrow 502. As depicted, cameras in a sensor system for aircraft 500 have generated images in which landmarks are identified. In this illustrative example, the landmarks identified are landmark 1 504, landmark 2 506, landmark 3 508, and landmark 4 510. In this illustrative example, bearings of these landmarks are determined (e.g., by navigator 208 in FIG. 2). The bearings are estimates of the bearings of the landmarks from aircraft 500. In this illustrative example, the bearings can be measured in degrees relative to magnetic north or to the direction of travel indicated by arrow 502 for aircraft 500.

In this illustrative example, a bearing can be determined based on the position of a camera generating an image of the landmark relative to the heading of the aircraft. Based on the positioning of the camera in the aircraft, the bearing of the landmark relative to the aircraft can be determined.

The sections around the landmarks illustrated in this figure are based on bearing estimations and a margin of error in the camera measurements in a sensor system. In other words, these sections indicate the bearing and a margin of error of the bearing of aircraft 500 to a landmark. For example, section 512 indicates a bearing (bold arrow within section 512) with a margin of error (section 512 boundaries) for the bearing of landmark 1 504. Section 514 indicates a bearing (bold arrow within section 514) with a margin of error (section 514 boundaries) for the bearing of landmark 2 506. Section 516 indicates a bearing (bold arrow within section 516) with a margin of error (section 516 boundaries) for the bearing of landmark 3 508. Section 518 indicates a bearing (bold arrow within section 518) with a margin of error (section 518 boundaries) for the bearing of landmark 4 510.

In this illustrative example, each section identifies an estimated bearing (bold arrow within section) with a margin of error (represented by the boundaries of the section). The bearing is from the nose or tip of the aircraft to the landmark.

In another illustrative example, the distance to the landmark can be measured for a better position estimate of the aircraft (e.g., by navigator 208 in FIG. 2). When distance is used, the distance can be measured in a number of ways. For example, the distance may be measured by at least one of motion or a change in the size of the landmark in the images over time. In addition to or in place of using the images, these measurements can be made using the images, a laser range finder, other suitable sensors, or through some other technique for measuring distance. In this example, the error distribution can be based on at least one of a camera resolution, a sharpness, a field-of-view, or an accuracy of the algorithm or process used to find the landmarks.

As depicted, multiple bearings and distances are estimated in this example. These estimations can be used to determine the position of the aircraft using techniques such as least-squares, a Hough transform, or some other suitable estimation technique. In this illustrative example, the position can also include the orientation or heading of the aircraft in addition to its location in three-dimensional space.

Figure 6:
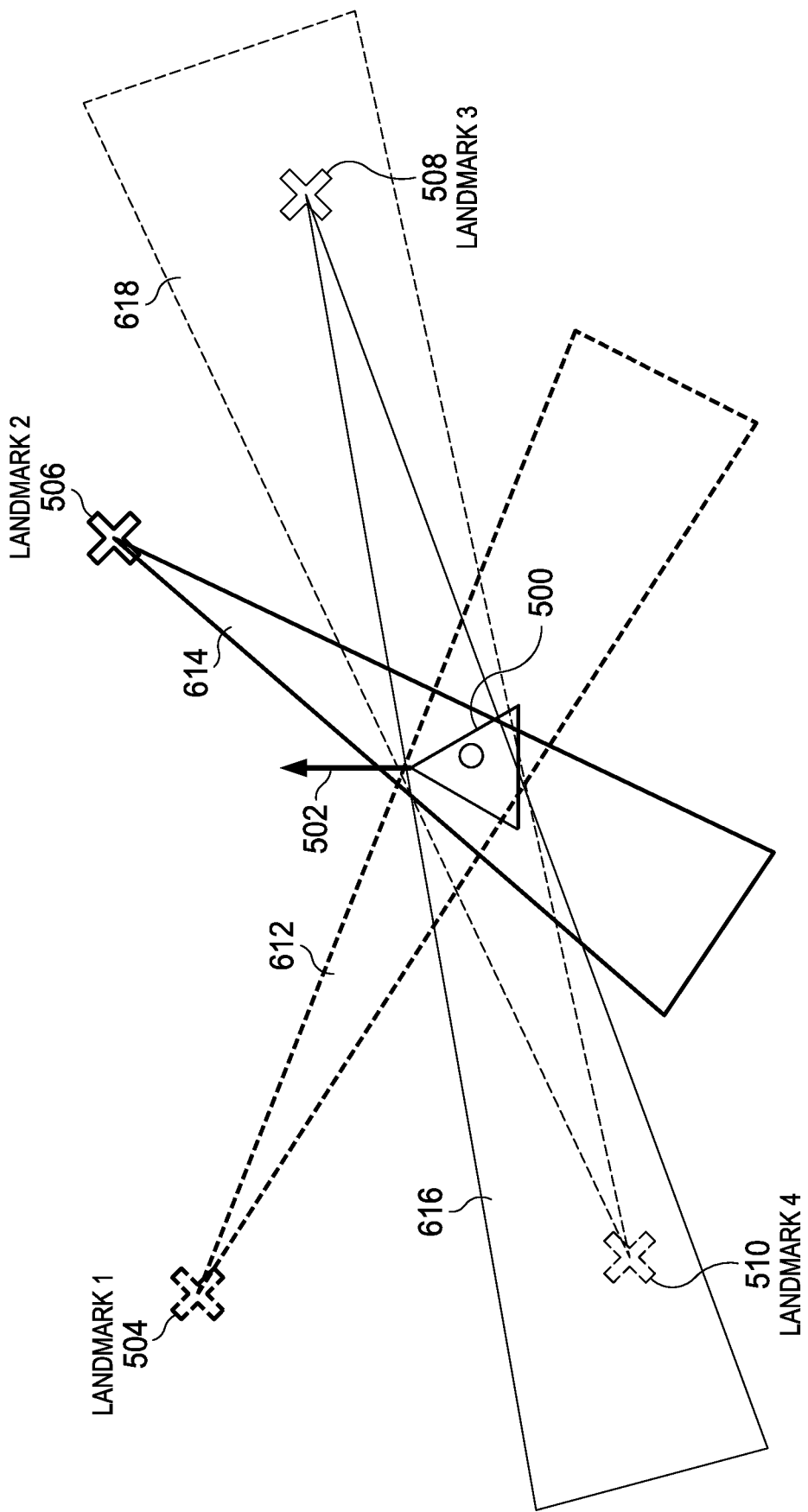
FIG. 6 is an illustration of distributions of potential aircraft locations in accordance with an illustrative embodiment.

With reference now to FIG. 6, an illustration of distributions of potential aircraft locations is depicted in accordance with an illustrative embodiment. In this figure, section 612, section 614, section 616, and section 618 are bearings of aircraft 500 from the perspective of the landmarks using the bearings identified in FIG. 5. These bearings are determined from the bearings in FIG. 5. For example, section 612 is an inversion of section 512; section 614 is an inversion of section 514; section 616 is an inversion of section 516; and section 618 is an inversion of section 518. Located relative to aircraft 500 to indicate possible relative locations of aircraft 500. The sections of these locations can be used to calculate a calculated position for aircraft 500. This calculation can be performed using a Hough transformation which provides a most likely position as a calculated position and a likely yaw for aircraft 500. In this example, the inversion of the bearings can be performed by adding 180 degrees to the measured bearing to the landmark. The distribution around the angle is the same in this example. The origin of measurement is shifted to the landmark measured location.

In the illustrative examples in FIG. 5 and FIG. 6, a Hough transformation is used to estimate the position of the aircraft based on geometries relative to detected landmarks. This geometry is defined by locations of the landmarks and the bearings to those landmarks. In the example, the geometry is depicted by the sections in these figures. This geometry reduces the possible area in which the aircraft can be located.

Turning next to FIG. 7, an illustration of a flowchart of a process for navigating an aircraft is depicted in accordance with an illustrative embodiment. The process in FIG. 7 can be implemented in hardware, software, or both. When implemented in software, the process can take the form of program code that is run by one of more processor units located in one or more hardware devices in one or more computer systems. For example, the process can be implemented in navigator 208 in computer system 206 in FIG. 2.

The process begins by scanning an environment around an aircraft for landmarks (operation 700). The process determines bearings of the landmarks (operation 702).

The process estimates a current position of the aircraft using the bearings of the landmarks (operation 704). The process performs a set of actions selected to guide the aircraft based on the current position of the aircraft (operation 706). The process terminates thereafter.

The process in FIG. 7 can be initiated when systems for determining the position of an aircraft do not provide prepositions with a desired level of accuracy. This process can be repeated any number of times as long as the current position of the aircraft is needed to perform actions to operate the aircraft.

In another illustrative example, the distance to a landmark can be determined in operation 702. This distance can be measured using data such as images or measurements of information in sensor information received from sensors. The sensors can include, for example, a camera, a light detection and ranging (LiDAR) system, a laser scanner, or some other suitable sensor. When the distance is measured, the distance can be used in operation 706 to determine a current position of the aircraft. The use of the distance in addition to a bearing can provide increased accuracy in the distance determined.

Turning to FIG. 8, an illustration of a flowchart of a process for scanning an environment for landmarks is depicted in accordance with an illustrative embodiment. The process illustrated in FIG. 8 is an example of one implementation for operation 700 in FIG. 7.

The process begins by receiving sensor information about an environment around an aircraft from a sensor system (operation 800). In operation 800, the sensor information can be, for example, images from a camera system, a laser scanner, or some other suitable sensor system.

The process identifies landmarks using the sensor information (operation 802). The process terminates thereafter. In operation 802, the identification of the landmarks from the sensor information can be performed using various techniques. For example, a machine learning model or multiple machine learning models can analyze sensor data such as images to identify the landmarks. In another illustrative example, other processes such those for computer vision and image processing can be used to detect the landmarks in the images.

With reference now to FIG. 9, an illustration of a flowchart of a process for estimating a current position of an aircraft is depicted in accordance with an illustrative embodiment. The process illustrated in FIG. 9 is an example of one implementation for operation 704 in FIG. 7.

The process begins by determining a calculated position of an aircraft using bearings of landmarks and locations of the landmarks (operation 900). In operation 900, the calculated position can be determined using a Hough transform process.

The process estimates a current position of the aircraft using the calculated position determined by a position calculator and aircraft state information received from a sensor system (operation 902). The process terminates thereafter.

Figure 10:
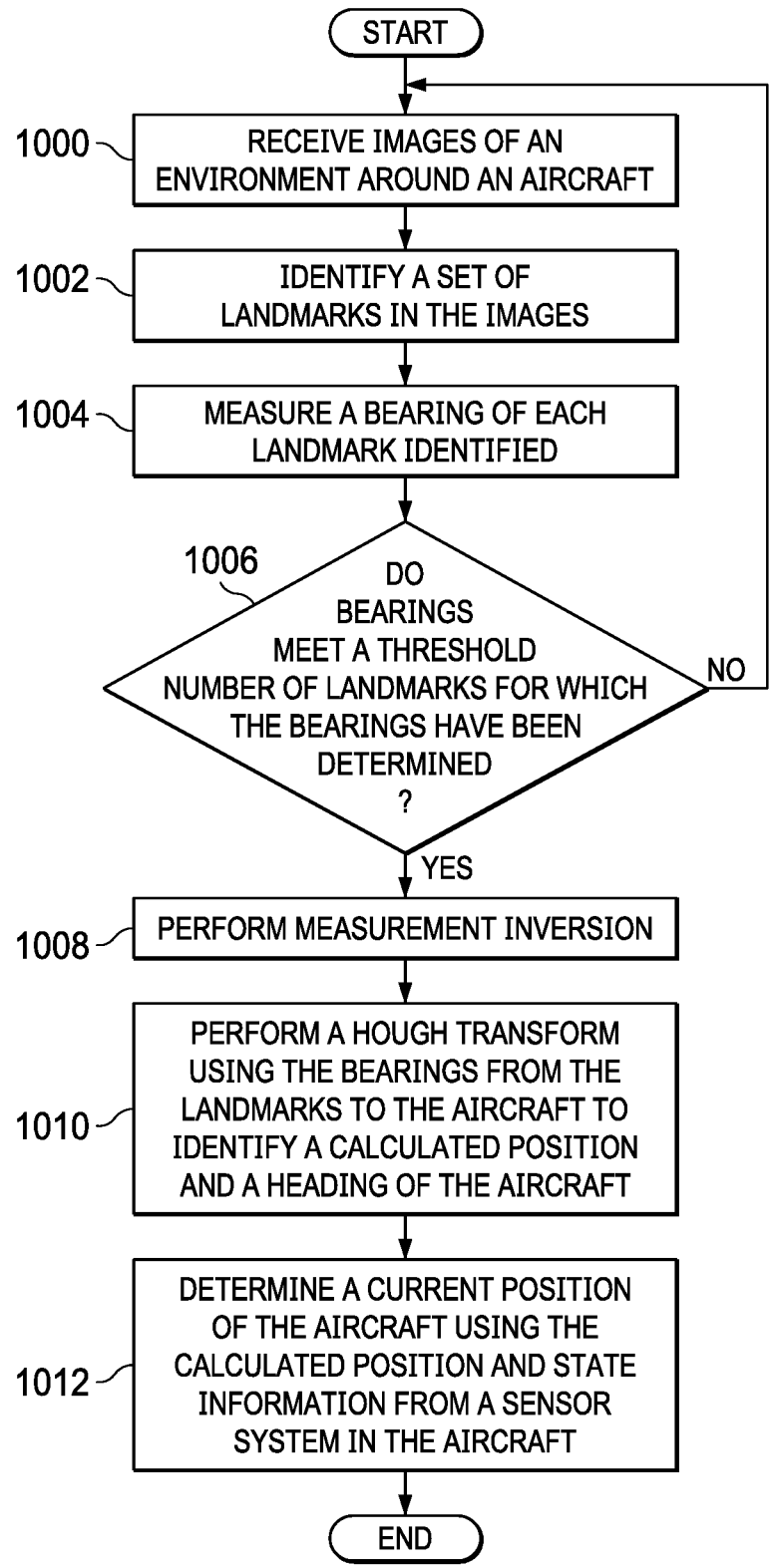
FIG. 10 is an illustration of a more detailed flowchart of a process for navigating an aircraft in accordance with an illustrative embodiment.

Turning to FIG. 10, an illustration of a more detailed flowchart of a process for navigating an aircraft is depicted in accordance with an illustrative embodiment;

The process in FIG. 10 can be implemented in hardware, software, or both. When implemented in software, the process can take the form of program code that is run by one or more processor units located in one or more hardware devices in one or more computer systems. For example, the process can be implemented in navigator 208 in computer system 206 in FIG. 2.

The process begins by receiving images of an environment around an aircraft (operation 1000). The process identifies a set of landmarks in the images (operation 1002). In operation 1002, the identification of the set of landmarks can include an identifier such as a name or other suitable identifier and the pixel location for each the landmark in the set of landmarks in the images.

The process then measures a bearing of each landmark identified (operation 1004). In this example, the bearings are relative to the current heading of the aircraft. The bearings can be determined based on the pixel location in the image, the position of the camera on the aircraft, aircraft control, and aircraft pitch. For example, the field-of-view of the camera and the pixel location of the landmark in the image can be used to determine the bearing relative to the field-of-view of the camera. The bearing relative to the camera can be translated to a bearing relative to the aircraft using the position and other information with respect to the camera. Further, the bearing relative to the aircraft can also be determined using the roll and pitch of the aircraft.

In this example, a position of the camera includes the orientation of the camera in addition to the three-dimensional location of the camera relative to an anchor point on the aircraft. In operation 1004, the identifier for a landmark is associated with the bearing determined for the landmark.

A determination is made as to whether bearings of the landmarks meet a threshold number of landmarks for which bearings have been determined (operation 1006). The threshold number of landmarks can take a number of different forms. For example, the threshold can be two landmarks, three landmarks, four landmarks, 17 landmarks, or some other number of landmarks. The number of bearings of the landmarks can be based on the accuracy desired, a density of landmarks in a particular area, or some other factor.

If the number of landmarks does not meet the threshold number of landmarks, the process returns to operation 1000 to identify the landmarks from another set of images.

Otherwise, the process performs measurement inversion (operation 1008). The process then performs a Hough transform using the bearings from the landmarks to the aircraft to identify a calculated position and a heading of the aircraft (operation 1010). The process then determines a current position of the aircraft using the calculated position and state information from a sensor system in the aircraft (operation 1012). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 11:
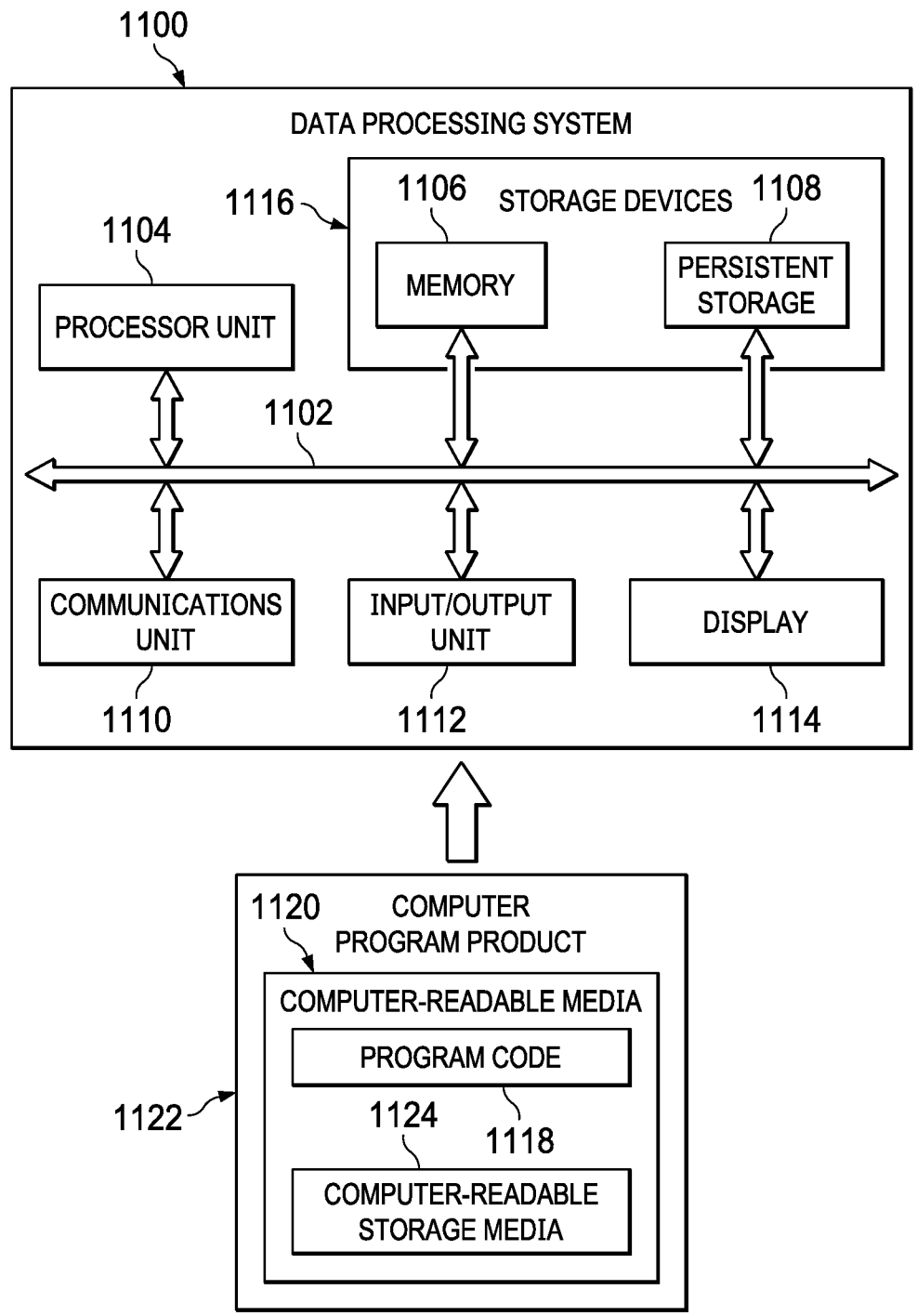
FIG. 11 is an illustration of a block diagram of a data processing system in accordance with an illustrative embodiment.

Turning now to FIG. 11, an illustration of a block diagram of a data processing system is depicted in accordance with an illustrative embodiment. Data processing system 1100 can be used to implement one or more data processing systems in computer system 206. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 takes the form of a bus system.

Processor unit 1104 serves to execute instructions for software that can be loaded into memory 1106. Processor unit 1104 includes one or more processors. For example, processor unit 1104 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1104 can may be implemented using one or more heterogeneous processor systems in which a main processor is present with secondary processors on a single chip. As another illustrative example, processor unit 1104 can be a symmetric multi-processor system containing multiple processors of the same type on a single chip.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, can be, for example, a random-access memory or any other suitable volatile or non-volatile storage device. Persistent storage 1108 can take various forms, depending on the particular implementation.

For example, persistent storage 1108 may contain one or more components or devices. For example, persistent storage 1108 can be a hard drive, a solid-state drive (SSD), a flash memory, a rewritable optical disk, a rewritable magnetic tape, or some combination of the above. The media used by persistent storage 1108 also can be removable. For example, a removable hard drive can be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that can be connected to data processing system 1100. For example, input/output unit 1112 can provide a connection for user input through at least one of a keyboard, a mouse, or some other suitable input device. Further, input/output unit 1112 can send output to a printer. Display 1114 provides a mechanism to display information to a user.

Instructions for at least one of the operating system, applications, or programs can be located in storage devices 1116, which are in communication with processor unit 1104 through communications framework 1102. The processes of the different embodiments can be performed by processor unit 1104 using computer-implemented instructions, which can be located in a memory, such as memory 1106.

These instructions are referred to as program code, computer usable program code, or computer-readable program code that can be read and executed by a processor in processor unit 1104. The program code in the different embodiments can be embodied on different physical or computer-readable storage medium, such as memory 1106 or persistent storage 1108.

Program code 1118 is located in a functional form on computer-readable media 1120 that is selectively removable and can be loaded onto or transferred to data processing system 1100 for execution by processor unit 1104. Program code 1118 and computer-readable media 1120 form computer program product 1122 in these illustrative examples. In the illustrative example, computer-readable media 1120 is computer-readable storage media 1124.

In these illustrative examples, computer-readable storage media 1124 is a physical or tangible storage device used to store program code 1118 rather than a medium that propagates or transmits program code 1118. Computer-readable storage media 1124, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1118 can be transferred to data processing system 1100 using a computer-readable signal media. The computer-readable signal media can be, for example, a propagated data signal containing program code 1118. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1120" can be singular or plural. For example, program code 1118 can be located in computer-readable media 1120 in the form of a single storage device or system. In another example, program code 1118 can be located in computer-readable media 1120 that is distributed in multiple data processing systems. In other words, some instructions in program code 1118 can be located in one data processing system while other instructions in program code 1118 can be located in one data processing system. For example, a portion of program code 1118 can be located in computer-readable media 1120 in a server computer while another portion of program code 1118 can be located in computer-readable media 1120 located in a set of client computers.

The different components illustrated for data processing system 1100 are not meant to provide architectural limitations to the manner in which different embodiments can be implemented. In some illustrative examples, one or more of the components may be incorporated in or otherwise form a portion of, another component. For example, memory 1106, or portions thereof, can be incorporated in processor unit 1104 in some illustrative examples. The different illustrative embodiments can be implemented in a data processing system including components in addition to or in place of those illustrated for data processing system 1100. Other components shown in FIG. 11 can be varied from the illustrative examples shown. The different embodiments can be implemented using any hardware device or system capable of running program code 1118.

Figure 12:
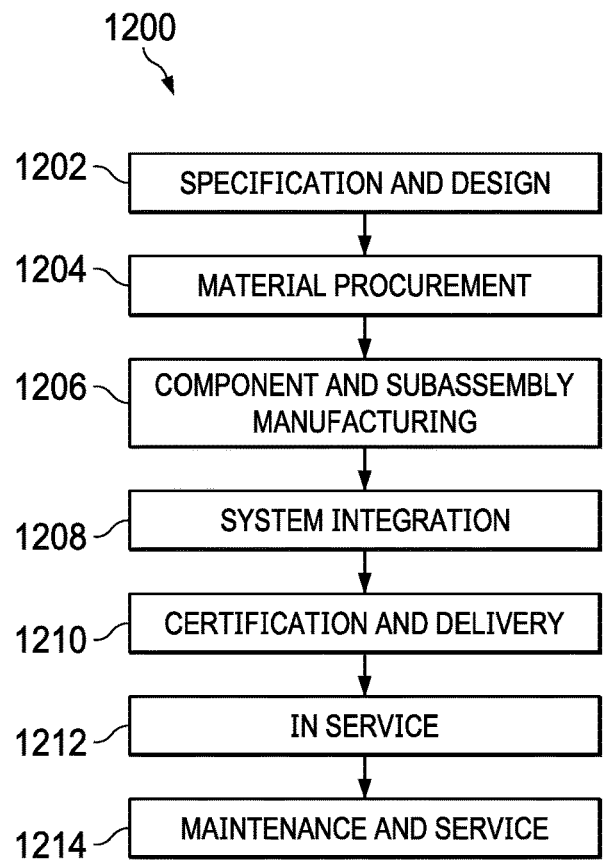
FIG. 12 is an illustration of an aircraft manufacturing and service method in accordance with an illustrative embodiment.
Figure 13:
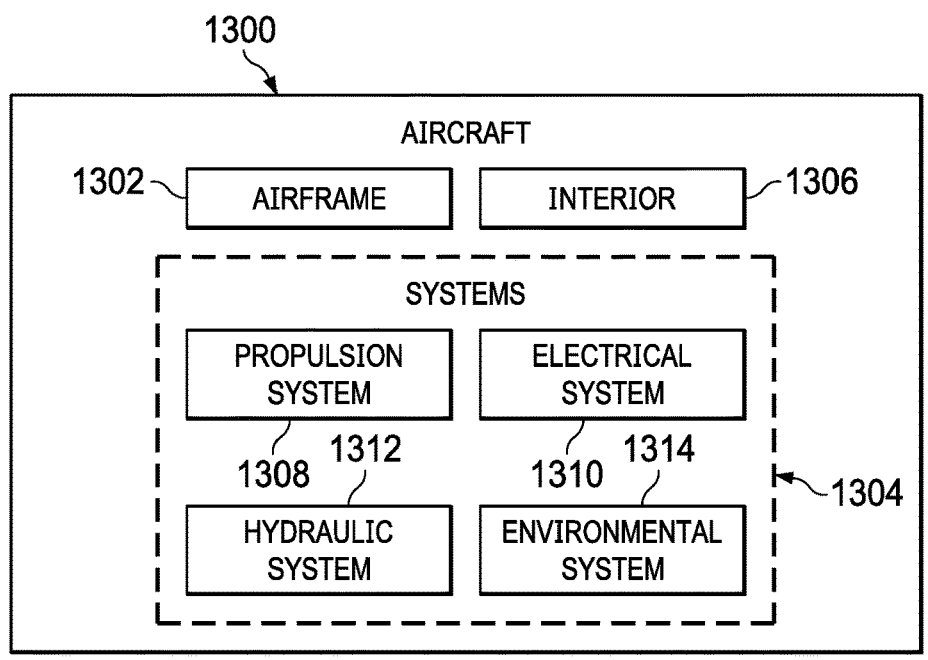
FIG. 13 is an illustration of a block diagram of an aircraft in which an illustrative embodiment may be implemented.

Illustrative embodiments of the disclosure may be described in the context of aircraft manufacturing and service method 1200 as shown in FIG. 12 and aircraft 1300 as shown in FIG. 13. Turning first to FIG. 12, an illustration of an aircraft manufacturing and service method is depicted in accordance with an illustrative embodiment. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 in FIG. 13 take place. Thereafter, aircraft 1300 in FIG. 13 can go through certification and delivery 1210 in order to be placed in service 1212. While in service 1212 by a customer, aircraft 1300 in FIG. 13 is scheduled for routine maintenance and service 1214, which may include modification, reconfiguration, refurbishment, and other maintenance or service.

Each of the processes of aircraft manufacturing and service method 1200 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of an aircraft is depicted in which an illustrative embodiment may be implemented. In this example, aircraft 1300 is produced by aircraft manufacturing and service method 1200 in FIG. 12 and may include airframe 1302 with plurality of systems 1304 and interior 1306. Examples of systems 1304 include one or more of propulsion system 1308, electrical system 1310, hydraulic system 1312, and environmental system 1314. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1200 in FIG. 12.

In one illustrative example, components or subassemblies produced in component and subassembly manufacturing 1206 in FIG. 12 can be fabricated or manufactured in a manner similar to components or subassemblies produced while aircraft 1300 is in service 1212 in FIG. 12. As yet another example, one or more apparatus embodiments, method embodiments, or a combination thereof can be utilized during production stages, such as component and subassembly manufacturing 1206 and system integration 1208 in FIG. 12. One or more apparatus embodiments, method embodiments, or a combination thereof may be utilized while aircraft 1300 is in service 1212, during maintenance and service 1214 in FIG. 12, or both. The use of a number of the different illustrative embodiments may substantially expedite the assembly of aircraft 1300, reduce the cost of aircraft 1300, or both expedite the assembly of aircraft 1300 and reduce the cost of aircraft 1300.

For example, aircraft navigation system 204 of FIG. 2 can be implemented aircraft 1300 during system integration 1208. Further, aircraft navigation system 204 can operate during in service 1212. As another example, aircraft navigation system 204 can be added to aircraft 1300 during maintenance and service 1214. The addition of aircraft navigation system 204 may only involve some components when others are already present in aircraft 1300. For example, navigator 208 of FIGS. 2-4 can be added while other components such as a sensor system is already present in aircraft 1300. The addition of these components can occur as part of types of operations performed during maintenance and service 1214. These operations include, for example, modification, reconfiguration, refurbishment, and other maintenance or service of aircraft 1300.

Thus, the illustrative embodiments provide a method, apparatus, system, and computer program product for navigating an aircraft. An environment around the aircraft is scanned by a computer system for landmarks. Bearings of the landmarks and locations of the landmarks are determined by the computer system. A current position of the aircraft is estimated by the computer system using the bearings of the landmarks and the locations of the landmarks. A set of actions selected to guide the aircraft based on the current position of the aircraft is performed by the computer system.

In the illustrative examples, the process can be initiated when other systems do not provide a current position of the aircraft with a desired level of accuracy. In the illustrative examples, an estimation system process, such as a Hough transform, can estimate the position of the aircraft based on geometries relative to detected landmarks. The estimated location of the landmarks can be transformed into an estimated location for the aircraft. The position calculated using the Hough transform can be modified or improved using other information describing a state of the aircraft from sensor systems in the aircraft.

As a result, an illustrative example can provide a current position of an aircraft when other systems are unable to provide the current position of the aircraft with the desired level of reliability. The illustrative example can reduce workloads by allowing a pilot to focus on a bearing, communicating, planning, and performing other actions instead of determining the position of the aircraft. Further, safety can be increased in addition to producing workloads.

Further, the disclosure comprises embodiments according to the following clauses:

Clause 1. An aircraft navigation system comprising:
a sensor system associated with an aircraft, wherein the sensor system is configured to generate images about an environment around the aircraft;
a landmark detector configured to receive the images, identify landmarks in the environment around the aircraft using the images, and determine bearings of the landmarks and locations of the landmarks;
a position calculator configured to determine a calculated position of the aircraft using the bearings of the landmarks and the locations of the landmarks;
a position estimator configured to estimate a current position of the aircraft using the calculated position determined by the position calculator and aircraft state information; and
a guidance system configured to provide a guidance to a target location using the current position of the aircraft.

Clause 2. The aircraft navigation system of claim 1, wherein the position calculator determines the calculated position of the aircraft using the bearings of the landmarks and the locations of the landmarks; the position estimator estimates the current position of the aircraft using the calculated position determined by the position calculator and the aircraft state information received from the sensor system; and the guidance system provides the guidance to the target location using the current position of the aircraft when the current position of the aircraft cannot be determined with a defined level of accuracy using a global positioning system receiver in the aircraft.

Clause 3. The aircraft navigation system as in any of Clauses 1 or 2, wherein the landmark detector comprises a machine learning model trained to detect the landmarks using the images, determine to the bearings and the locations of the landmarks.

Clause 4. The aircraft navigation system as in any of Clauses 1-3, wherein the aircraft state information is received from the sensor system.

Clause 5. The aircraft navigation system as in any of Clauses 14, wherein the sensor system comprises a sensor selected from at least one of a camera, a visible light camera, a hyperspectral sensor, a light detection and ranging (LiDAR) system, a synthetic aperture radar (SAR) system, a laser scanner system, an inertial measurement unit, a magnetometer, a barometric altitude sensor, or a VHF omnidirectional range receiver.

Clause 6. The aircraft navigation system as in any of Clauses 1-5, wherein the landmarks are selected from at least one of a natural feature, an artificial feature, a mountain, a plateau, a tree, a lake, a pond, a river, an ocean, a field, a building, an antenna, an airfield, a runway, a road, a quarry, a bridge, a manufacturing facility, a dam, a radio tower, or a monument.

Clause 7. The aircraft navigation system as in any of Clauses 1-6, wherein the aircraft is selected from one of an airplane, a rotorcraft, an unmanned aerial vehicle, an unmanned aerial system, a manned aerial vehicle, a commercial aircraft, and a military aircraft.

Clause 8. An apparatus comprising:
a computer system; and
a navigator in the computer system, wherein the navigator is configured to:
facilitate a scan of an environment around an aircraft for landmarks;
determine bearings of the landmarks and locations of the landmarks;
estimate a current position of the aircraft using the bearings of the landmarks and the locations of the landmarks; and
initiate a performance of a set of actions selected to guide the aircraft based on the current position of the aircraft.

Clause 9. The apparatus of Clause 8, wherein the navigator is configured to:
initiate scanning the environment around the aircraft for the landmarks; determine the bearings of the landmarks and the locations of the landmarks; estimate the current position of the aircraft using the bearings of the landmarks and the locations of the landmarks; and initiating the performance of the set of actions selected to guide the aircraft based on the current position of the aircraft when the current position of the aircraft cannot be determined with a defined level of accuracy using a global positioning system receiver in the aircraft.

Clause 10. The apparatus as in any of Clauses 8-9, wherein the navigator is configured to:
determine a calculated position of the aircraft using the bearings of the landmarks and the locations of the landmarks; and
estimate the current position of the aircraft using the calculated position and aircraft state information from a sensor system.

Clause 11. The apparatus as in any of Clauses 8-10, wherein in estimating the current position of the aircraft using the bearings, the navigator is configured to:
estimate the current position of the aircraft using the bearings of the landmarks, the locations of the landmarks, and at least one of a Hough transform, a maximum likelihood estimate, a probability convolution, a Bayesian estimation, or a machine learning model.

Clause 12. The apparatus as in any of Clauses 8-11, wherein in estimating the current position of the aircraft using the bearings of the landmarks and the locations of the landmarks, the navigator is configured to:
estimate the current position of the aircraft and a yaw of the aircraft using the bearings of the landmarks and the locations of the landmarks.

Clause 13. The apparatus of Clause 12, wherein in estimating the current position of the aircraft and the yaw of the aircraft using the bearings, the navigator is configured to:
estimate the current position of the aircraft and the yaw of the aircraft using the bearings of the landmarks and the locations of the landmarks, and a Hough transform.

Clause 14. The apparatus as in any of Clauses 8-13, wherein in facilitating the scan of the environment around the aircraft for the landmarks, the navigator is configured to:
receive images from a camera system for the aircraft; and
identify, using a machine learning model in the computer system, the landmarks in the images.

Clause 15. The apparatus as in any of Clauses 8-14, wherein in facilitating the scan of the environment around the aircraft for the landmarks, the navigator is configured to:

receive sensor information about the environment around the aircraft from a sensor system; and identify the landmarks using the sensor information.

Clause 16. The apparatus of Clause 15, wherein the sensor system comprises a set of sensors selected from at least one of a camera, a visible light camera, a hyperspectral sensor, a light detection and ranging (LiDAR) system, a synthetic aperture radar (SAR) system, a laser scanner system, an inertial measurement unit, a magnetometer, a barometric altitude sensor, or a VHF omnidirectional range receiver.

Clause 17. The apparatus of Clause 15, wherein in identifying the landmarks using the sensor information, the navigator is configured to:

identify the landmarks using the sensor information and a landmark information stored in a landmark data store.

Clause 18. The apparatus as in any of Clauses 8-17, wherein the set of actions is selected from at least one of selecting a target location for the aircraft, generating a waypoint command to change a heading of the aircraft to reach the target location, generating an altitude command to change an altitude of the aircraft, generating a flight plan to reach the target location, or displaying the heading for the aircraft on a graphical user interface in a display system.

Clause 19. The apparatus of as in any of Clauses 8-17, wherein the landmarks are selected from at least one of a natural feature, an artificial feature, a mountain, a plateau, a tree, a lake, a pond, a river, an ocean, a field, a building, an antenna, an airfield, a runway, a road, a quarry, a bridge, a manufacturing facility, a dam, a radio tower, or a monument.

Clause 20. The apparatus as in any of Clauses 8-19, wherein the aircraft is selected from one of an airplane, a rotorcraft, an unmanned aerial vehicle, an unmanned aerial system, a manned aerial vehicle, a commercial aircraft, and a military aircraft.

Clause 21. A method for navigating an aircraft, the method comprising:

receiving, by a computer system, information indicative of a result of a scan of an environment around the aircraft for landmarks;

determining, by the computer system, bearings of the landmarks and locations of the landmarks;

estimating, by the computer system, a current position of the aircraft using the bearings of the landmarks and the locations of the landmarks; and determining, by the computer system, a set of actions that are to be performed to guide the aircraft based on the current position of the aircraft.

Clause 22. The method of Clause 21 further comprising:

initiating receiving, by the computer system, information indicative of the result of the scan of the environment around the aircraft for the landmarks; determining, by the computer system, the bearings of the landmarks and the locations of the landmarks; estimating, by the computer system, the current position of the aircraft using the bearings of the landmarks and the locations of the landmarks; and determining, by the computer system, the set of actions that are to be performed the set of actions selected to guide the aircraft based on the current position of the aircraft when the current position of the aircraft cannot be determined with a defined level of accuracy using a global positioning system receiver in the aircraft.

Clause 23. The method as in any of Clauses 21-22, wherein estimating, by the computer system, the current position of the aircraft using the bearings of the landmarks and the locations of the landmarks comprises:

determining, by the computer system, a calculated position of the aircraft using the bearings of the landmarks and the locations of the landmarks; and estimating, by the computer system, the current position of the aircraft using the calculated position determined by the position calculator and aircraft state information received from a sensor system.

Clause 24. The method as in any of Clauses 21-23, wherein estimating, by the computer system, the current position of the aircraft using the bearings of the landmarks and the locations of the landmarks comprises:

estimating, by the computer system, the current position of the aircraft using the bearings of the landmarks, the locations of the landmarks, and at least one of a Hough transform, a maximum likelihood estimate, a probability convolution, a Bayesian estimation, or a machine learning model.

Clause 25. The method as in any of Clauses 21-24, wherein estimating, by the computer system, the current position of the aircraft using the bearings comprises:

estimating, by the computer system, the current position of the aircraft and a yaw of the aircraft using the bearings.

Clause 26. The method of Clause 25, wherein estimating, by the computer system, the current position of the aircraft and the yaw of the aircraft using the bearings comprises:

estimating, by the computer system, the current position of the aircraft and the yaw of the aircraft using the bearings and a Hough transform.

Clause 27. The method as in any of Clauses 21-26, wherein receiving, by the computer system, information indicative of a result of the scan of the environment around the aircraft for the landmarks comprises:

receiving, by the computer system, images from a camera system for the aircraft; and identifying, by a machine learning model in the computer system, the landmarks in the images.

Clause 28. The method as in any of Clauses 21-27, wherein receiving, by the computer system, information indicative of a result of the scan of, the environment around the aircraft for the landmarks comprises:

receiving, by the computer system, sensor information about the environment around the aircraft from a sensor system; and identifying, by the computer system, the landmarks using the sensor information to form the result.

Clause 29. The method of Clause 28, wherein the sensor system comprises sensor selected from at least one of a camera, a visible light camera, a hyperspectral sensor, a light detection and ranging (LiDAR) system, a synthetic aperture radar (SAR) system, a laser scanner system, an inertial measurement unit, a magnetometer, a barometric altitude sensor, or a VHF omnidirectional range receiver.

Clause 30. The method of Clause 28, wherein identifying the landmarks using the sensor information comprises:

identifying, by the computer system, the landmarks using the sensor information and landmark information stored in a landmark data store.

Clause 31. The method as in any of Clauses 21-30, wherein the set of actions is selected from at least one of selecting a target location for the aircraft, generating a waypoint command to change a heading of the aircraft to reach the target location, generating an altitude command to change an altitude of the aircraft, generating a flight plan to reach the target location, and displaying the heading for the aircraft on a graphical user interface in a display system.

Clause 32. The method as in any of Clauses 21-31, wherein the landmarks are selected from at least one of a natural feature, an artificial feature, a mountain, a plateau, a tree, a lake, a pond, a river, an ocean, a field, a building, an antenna, an airfield, a runway, a road, a quarry, a bridge, a manufacturing facility, a dam, a radio tower, or a monument.

Clause 33. The method as in any of Clauses 21-31, wherein the aircraft is selected from one of an airplane, a rotorcraft, an unmanned aerial vehicle, an unmanned aerial system, a manned aerial vehicle, a commercial aircraft, and a military aircraft.

Clause 34. A computer program product for navigating an aircraft, the computer program product comprising:
 a computer-readable storage media;
 first program code, stored on the computer-readable storage media, executable by a computer system to cause the computer system to receive information indicative of a result of a scan of an environment around the aircraft for landmarks;
 second program code, stored on the computer-readable storage media, executable by the computer system to cause the computer system to determine bearings of the landmarks and locations of the landmarks;
 third program code, stored on the computer-readable storage media, executable by the computer system to cause the computer system to estimate a current position of the aircraft using the bearings of the landmarks and the locations of the landmarks; and
 fourth program code, stored on the computer-readable storage media, executable by the computer system to cause the computer system to determine a set of actions that are to be performed to guide the aircraft based on the current position of the aircraft.

Clause 35. The computer program product of Clause 34 further comprising:
 fifth program code, stored on the computer-readable storage media, executable by the computer system to cause the computer system to initiate execution of the first program code, the second program code, the third program code, and the fourth program code when the current position of the aircraft cannot be determined with a defined level of accuracy using a global positioning system receiver in the aircraft.

Clause 36. The computer program product as in any of Clauses 34-35, wherein the third program code comprises:
 program code, stored on the computer-readable storage media, executable by the computer system to cause the computer system to determine a calculated position of the aircraft using the bearings to the landmarks and the locations of the landmarks; and
 program code, stored on the computer-readable storage media, executable by the computer system to cause the computer system to estimate the current position of the aircraft using the calculated position determined by the position calculator and aircraft state information received from a sensor system.

Clause 37. The computer program product of Clause 36, wherein the sensor system comprises sensor selected from at least one of a camera, a visible light camera, a hyperspectral sensor, a light detection and ranging (LiDAR) system, a synthetic aperture radar (SAR) system, or a laser scanner system, an inertial measurement unit, a magnetometer, a barometric altitude sensor, or a VHF omnidirectional range receiver.

Clause 38. The computer program product as in any of Clauses 34-37, wherein the landmarks are selected from at least one of a natural feature, an artificial feature, a mountain, a plateau, a tree, a lake, a pond, a river, an ocean, a field, a building, an antenna, an airfield, a runway, a road, a quarry, a bridge, a manufacturing facility, a dam, a radio tower, or a monument.

Clause 39. The computer program product as in any of Clauses 34-38, wherein the aircraft is selected from one of an airplane, a rotorcraft, an unmanned aerial vehicle, an unmanned aerial system, a manned aerial vehicle, a commercial aircraft, and a military aircraft.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft navigation system that comprises:
 a sensor system associated with an aircraft, wherein the sensor system is configured to generate images about an environment around the aircraft;
 a landmark detector in a flight control system of the aircraft configured to:
  receive the images from the sensor system;
  identify, based upon the images, landmarks in the environment around the aircraft; and
  determine bearings from the aircraft to the landmarks;
 a position calculator configured to:
  determine, respectively for each landmark in each image in the images and based upon a pixel location of each landmark in each image, a section that comprises a location of the landmark, the section defined by:
   a bearing from the aircraft to the landmark and an error distribution of the bearing from the aircraft to the landmark; and
   a distance from the aircraft to the landmark and an error distribution of the bearing from the aircraft to the landmark;
  invert, respectively for each landmark in each image in the images, the section and derive therefrom:
   a bearing from the landmark to the aircraft and an error distribution of the bearing from the landmark to the aircraft; and
   a distance from the landmark to the aircraft and an error distribution of the bearing from the landmark to the aircraft; and therefrom
   a calculated position of the aircraft;

a position estimator configured to, based upon aircraft state information and the calculated position of the aircraft, form an estimate of a current position of the aircraft; and a guidance system configured to provide, based upon the estimate of the current position of the aircraft, a guidance that directs the aircraft to a target location.

2. The aircraft navigation system of claim 1, wherein:
the calculated position of the aircraft comprises an orientation of the aircraft;
the position estimator is further configured to:
receive the aircraft state information from the sensor system; and
the guidance system is further configured, when the current position of the aircraft cannot be determined with a defined level of accuracy using a global positioning system receiver, to provide, based upon the current position of the aircraft, the guidance to the target location.

3. The aircraft navigation system of claim 1, wherein the landmark detector comprises a machine learning model trained to:
detect the landmarks based upon the images; and
determine the bearings from the aircraft to, and the locations of, the landmarks.

4. The aircraft navigation system of claim 1, wherein the aircraft state information comprises at least one of: an airspeed, a barometric altitude, a rate of acceleration, a magnetic heading, a pitch, a roll, a vertical speed, a pitch rate, an angle of attack, or a VOR derived position, of the aircraft.

5. An apparatus that comprises:
a sensor system of an aircraft;
a computer system; and
a navigator in the computer system, wherein the navigator is configured to:
control a scan of an environment around the aircraft for landmarks;
determine, respectively for each landmark in the landmarks and based upon a pixel location of each landmark in an image from the sensor system, a sector defined by:
a bearing from the aircraft to the landmark and an error distribution of the bearing from the aircraft to the landmark; and
a distance from the aircraft to the landmark and an error distribution of the bearing from the aircraft to the landmark;
derive locations of the landmarks and, based upon an inversion of the sector for each landmark, a calculated position of the aircraft;
estimate, based upon a state of the aircraft and the calculated position of the aircraft, a current position of the aircraft; and
generate a set of actions selected to guide the aircraft based on the current position of the aircraft.

6. The apparatus of claim 5, wherein the navigator is configured to:
initiate a scan of the environment around the aircraft for the landmarks;
determine the bearings of the landmarks and the locations of the landmarks;
estimate, when the current position of the aircraft cannot be determined with a defined level of accuracy based upon a global positioning system receiver in the aircraft, the current position of the aircraft using the bearings of the landmarks and the locations of the landmarks; and
initiate performance by the aircraft of the set of actions selected to guide the aircraft based on an estimate of the current position of the aircraft.

7. The apparatus of claim 5, wherein the navigator is further configured to estimate, based upon the calculated position and aircraft state information from the sensor system, an orientation of the aircraft.

8. The apparatus of claim 5, wherein the navigator is further configured to estimate, based upon at least one of: a Hough transform, a Bayesian estimation, or a machine learning model. the current position of the aircraft.

9. The apparatus of claim 5, wherein the navigator is further configured to estimate a yaw of the aircraft.

10. The apparatus of claim 9, wherein the navigator is further configured to, based upon: a Hough transform, the inversion of the bearings from the aircraft to the landmarks, and the locations of the landmarks, estimate the current position of the aircraft.

11. The apparatus of claim 5, wherein the navigator is further configured to:
receive images from a camera system for the aircraft; and
identify, based upon a machine learning model in the computer system, the landmarks in the images.

12. The apparatus of claim 5, wherein the navigator is further configured to:
receive sensor information about the environment around the aircraft from the sensor system; and
identify the landmarks based upon the sensor information.

13. The apparatus of claim 12, wherein the sensor system comprises a set of sensors selected from at least one of: a camera, a hyperspectral sensor, a light detection and ranging (LiDAR) system, a synthetic aperture radar (SAR) system, a laser scanner system, an inertial measurement unit, a magnetometer, a barometric altitude sensor, or a VHF omnidirectional range receiver.

14. The apparatus of claim 12, wherein the navigator is further configured to:
identify the landmarks based upon the sensor information and landmark information stored in a landmark data store.

15. The apparatus of claim 5, wherein the set of actions is selected from at least one of:
selection of a target location for the aircraft;
generation of a waypoint command to change a heading of the aircraft to reach the target location:
generation of an altitude command to change an altitude of the aircraft;
generation of a flight plan to reach the target location; or
display of the heading for the aircraft on a graphical user interface in a display system.

16. The apparatus of claim 5, wherein the landmarks are selected from at least one of: a natural feature, an artificial feature, a mountain, a plateau, a tree, a lake, a pond, a river, an ocean, a field, a building, an antenna, an airfield, a runway, a road, a quarry, a bridge, a manufacturing facility, a dam, a radio tower, or a monument.

17. The apparatus of claim 5, wherein the aircraft is selected from one of: an airplane, a rotorcraft, an unmanned aerial vehicle, an unmanned aerial system, a manned aerial vehicle, a commercial aircraft, and a military aircraft.

18. A method for navigating an aircraft, the method comprising the aircraft comprising a navigation system executing the following steps:

receiving a result of a scan by a sensor on the aircraft of an environment around the aircraft for landmarks;
determining sections defined by:
bearings and error distributions of the bearings from the aircraft to the landmarks;
distances and error distributions of the distances from the aircraft to the landmarks; and
deriving, from the sections, locations of the landmarks;
inverting:
the bearings and error distributions of the bearings from the aircraft to the landmarks;
the distances and error distributions of the distances from the aircraft to the landmarks; and deriving therefrom:
bearings and error distributions of the bearings from the landmarks to the aircraft;
distances and error distributions of the distances from the landmarks to the aircraft; and deriving therefrom:
a calculated position of the aircraft;
estimating, using a state of the aircraft and the calculated position of the aircraft, a current position of the aircraft; and
determining a set of actions that are to be performed to guide the aircraft based on the current position of the aircraft.

19. The method of claim 18 further comprising:
initiating receiving, by the computer system, information indicative of the result of the scan of the environment around the aircraft for the landmarks; and
determining, by the computer system when the current position of the aircraft cannot be determined with a defined level of accuracy using a global positioning system receiver in the aircraft, the set of actions that are to be performed to guide the aircraft based on the current position of the aircraft.

20. The method of claim 18, wherein the state of the aircraft comprises at least one of: an airspeed, a barometric altitude, a rate of acceleration, a magnetic heading, a pitch, a roll, a vertical speed, a pitch rate, an angle of attack, or a Very High Frequency Omni-directional Range navigation system derived position, of the aircraft.

21. The method of claim 18, further comprising using: the bearings from the landmarks, the locations of the landmarks, and at least one of: a Hough transform, a Bayesian estimation, or a machine learning model.

22. The method of claim 18, further comprising, the computer system estimating a yaw of the aircraft.

23. The method of claim 22, further comprising, forming, using the bearings and error distributions of the bearings from the landmarks to the aircraft and a Hough transform, the current position of the aircraft and the yaw of the aircraft.

24. The method of claim 18, further comprising:
receiving images from a camera system for the aircraft; and
identifying, by a machine learning model in the navigation system, the landmarks in the images.

25. The method of claim 18, wherein the sensor on the aircraft comprises at least one of: a camera, a hyperspectral sensor, a light detection and ranging (LiDAR) system, a synthetic aperture radar (SAR) system, a laser scanner system, an inertial measurement unit, a magnetometer, a barometric altitude sensor, or a VHF omnidirectional range receiver.

26. The method of claim 25, further comprising using sensor information and landmark information stored in a landmark data store.

27. The method of claim 18, wherein the set of actions is selected from at least one of: selecting a target location for the aircraft, generating a waypoint command to change a heading of the aircraft to reach the target location, generating an altitude command to change an altitude of the aircraft, generating a flight plan to reach the target location, or displaying the heading for the aircraft on a graphical user interface in a display system.

28. A computer program product in a navigation system in an aircraft, wherein the computer program product comprises:
a non-transitory computer-readable storage media that comprises;
first program code configured to cause a computer system to receive information indicative of a result of a scan of an environment around the aircraft for landmarks;
second program code configured to cause the computer system to determine sections defined by:
bearings and error bearings and error distributions of the bearings from the aircraft to the landmarks;
distances and error distributions of the distances from the aircraft to the landmarks;
third program code, stored on the computer-readable storage media and configured to cause the computer system to:
invert sections and derive bearings and error distributions of the bearings from the landmarks to the aircraft; and
derive therefrom an estimate of a current position of the aircraft; and
fourth program code, stored on the computer-readable storage media and configured to cause the computer system to determine a set of actions that are to be performed to guide the aircraft based on the estimate of the current position of the aircraft.

* * * * *

UNITED STATES PATENT AND TRADEMARK OFFICE
CERTIFICATE OF CORRECTION

PATENT NO. : 11,808,578 B2
APPLICATION NO. : 16/888237
DATED : November 7, 2023
INVENTOR(S) : John B. Wissler and Jeffery Saunders It is certified that error appears in the above-identified patent and that said Letters Patent is hereby corrected as shown below:

In the Claims

Column 28, Line 14, correct "learning model. the current position of the aircraft." to read -- learning model, the current position of the aircraft. --

Signed and Sealed this
Nineteenth Day of December, 2023

Katherine Kelly Vidal
*Director of the United States Patent and Trademark Office*